(12) United States Patent
Li et al.

(10) Patent No.: US 12,462,157 B2
(45) Date of Patent: Nov. 4, 2025

(54) AUTOMATIC CHANNEL PRUNING VIA GRAPH NEURAL NETWORK BASED HYPERNETWORK

(71) Applicant: Baidu USA, LLC, Sunnyvale, CA (US)

(72) Inventors: Baopu Li, Santa Clara, CA (US); Qiuling Suo, Sunnyvale, CA (US); Yuchen Bian, Santa Clara, CA (US)

(73) Assignee: Baidu USA LLC, Sunnyvale, CA (US)

(*) Notice: Subject to any disclaimer, the term of this patent is extended or adjusted under 35 U.S.C. 154(b) by 773 days.

(21) Appl. No.: 17/846,555

(22) Filed: Jun. 22, 2022

(65) Prior Publication Data

US 2023/0084203 A1 Mar. 16, 2023

Related U.S. Application Data

(60) Provisional application No. 63/241,095, filed on Sep. 6, 2021.

(51) Int. Cl.
| | |
|---|---|
| *G06N 3/082* | (2023.01) |
| *G06N 3/04* | (2023.01) |
| *G06N 3/0499* | (2023.01) |
| *G06N 3/0985* | (2023.01) |
| *G06N 3/0455* | (2023.01) |

(52) U.S. Cl.
CPC .......... *G06N 3/082* (2013.01); *G06N 3/04* (2013.01); *G06N 3/0499* (2023.01); *G06N 3/0985* (2023.01); *G06N 3/0455* (2023.01)

(58) Field of Classification Search
CPC ........ G06N 3/082; G06N 3/04; G06N 3/0464; G06N 3/0442; G06N 3/084; G06N 3/0985; G06N 3/0455; G06N 3/0499
See application file for complete search history.

(56) References Cited

U.S. PATENT DOCUMENTS

| | | | |
|---|---|---|---|
| 2019/0251441 A1* | 8/2019 | Lu | G06N 3/082 |
| 2020/0372355 A1* | 11/2020 | Tarlow | G06N 3/08 |
| 2021/0264278 A1* | 8/2021 | Liu | G06N 3/082 |

OTHER PUBLICATIONS

Liu, Wenfeng, et al. "Locality Preserving Dense Graph Convolutional Networks with Graph Context-Aware Node Representations." arXiv preprint arXiv:2010.05404 (2020). (Year: 2020).*

(Continued)

*Primary Examiner* — Andrew L Tank
(74) *Attorney, Agent, or Firm* — Oppedahl Patent Law Firm LLC

(57) ABSTRACT

Model pruning is used to trim large neural networks, like convolutional neural networks (CNNs), to reduce computation overheads. Existing model pruning methods mainly rely on heuristics rules or local relationships of CNN layers. A novel hypernetwork based on graph neural network is disclosed for generating and evaluating pruned networks. A graph is first constructed according to information flow of channels and layers in a CNN network, with channels and layers represented as nodes and information flows represented as edges. A graph neural network is applied to aggregate both local and global dependencies across all channels and layers of the CNN network, resulting in informative node embeddings. With such embeddings, pruned CNN networks including their architectures and weights may be effectively generated and evaluated.

15 Claims, 10 Drawing Sheets

(56) References Cited

OTHER PUBLICATIONS

Liu, Na, et al. "Stack attention-pruning aggregates multiscale graph convolution networks for hyperspectral remote sensing image classification." IEEE Access 9 (2021): 44974-44988. (Year: 2021).*
Xie, Zhouyang, et al. "Pruning with compensation: efficient channel pruning for deep convolutional neural networks." arXiv preprint arXiv:2108.13728 (2021). (Year: 2021).*
Wu et al.,"Causal Distillation for Language Models," arXiv preprint arXiv:2112.02505, 2021. (7pgs).
Yang et al.,"Hierarchical Self-supervised Augmented Knowledge Distillation," in Proceedings of International Joint Conference on Artificial Intelligence, 2021. (7pgs).
Yin et al.,"Towards efficient tensor decomposition-based dnn model compression with optimization framework," arXiv preprint arXiv:2107.12422, 2021. (10pgs).
Zeiler et al.,"Visualizing and understanding convolutional networks," arXiv preprint arXiv:1311.2901, 2013. (11pgs).
Zhang et al.,"Efficient inference of CNNs via channel pruning," arXiv preprint arXiv:1908.03266, 2019. (8pgs).
Zhang et al.,"Graph HyperNetworks for Neural Architecture Search," arXiv preprint arXiv:1810.05749, 2018. (16pgs).
Zhang et al.,"Graph Pruning for Model Compression," arXiv preprint arXiv:1911.09817, 2021. (12pgs).
Zhao et al.,"Variational Convolutional Neural Network Pruning," in Proceedings of the IEEE/CVF Conference on Computer Vision & Pattern Recognition, 2019. (10pgs).
Zhuang et al.,"Discrimination-aware channel pruning for deep neural networks," Advances in neural information processing systems, 2018. (12pgs).
Hamilton et al.,"Inductive representation learning on large graphs," Advances in neural information processing systems, 2017. (11pgs).
He et al.,"Soft Filter Pruning for Accelerating Deep Convolutional Neural Networks," arXiv preprint arXiv:1808.06866, 2018. (8pgs).
He et al.,"AMC: AutoML for Model Compression and Acceleration on Mobile Devices," in Proceedings of the European conference on computer vision (ECCV), 2018. (17pgs).
He et al.,"Filter Pruning via Geometric Median for Deep Convolutional Neural Networks Acceleration,", in Proceedings of the IEEE/CVF Conference on Computer Vision & Pattern Recognition, 2019. (10pgs).
He et al.,"Channel Pruning for Accelerating Very Deep Neural Networks," in Proceedings of the IEEE international conference on computer vision, 2017. (9pgs).
Huang et al.,"Data-Driven Sparse Structure Selection for Deep Neural Networks," in Proceedings of the European conference on computer vision (ECCV), 2018. (17pgs).
Kipf et al.,"Semi-supervised classification with graph convolutional networks," arXiv preprint arXiv:1609.02907, 2017. (14pgs).
Koratana et al.,"LIT: Learned Intermediate Representation Training for Model Compression," in Proceedings of the International Conference on Machine Learning, 2019. (10pgs).
Le et al.,"Tiny ImageNet Visual Recognition Challenge," CS231N course, Stanford University, 2015. (6pgs).
Bengio et al.,"Estimating or propagating gradients through stochastic neurons for conditional computation," arXiv preprint arXiv:1308.3432, 2013. (12pgs).
Brock et al.,"SMASH: One-Shot Model Architecture Search through HyperNetworks," in Proc. of the International Conference on Learning Representations, 2018. (22pgs).
Chen et al.,"A Hierarchical Graph Network for 3D Object Detection on Point Clouds," in Proc. of the IEEE/CVF conf. on computer vision & pattern recognition, 2020. (10pgs).
Ding et al.,"Approximated Oracle Filter Pruning for Destructive CNN Width Optimization," in Proc. of the International Conference on Machine Learning, 2019. (10pgs).

Dong et al.,"Network Pruning via Transformable Architecture Search," Advances in Neural Information Processing Systems, 2019. (12pgs).
Gao et al.,"Discrete Model Compression With Resource Constraint for Deep Neural Networks," in Proceedings of the IEEE/CVF Conference on Computer Vision and Pattern Recognition (CVPR). 2020. (10pgs).
Guo et al.,"Channel Pruning Guided by Classification Loss and Feature Importance," in Proceedings of the AAAI Conference on Artificial Intelligence, 2020. (8pgs).
Guo et al.,"DMCP: Differentiable Markov Channel Pruning for Neural Networks," in Proceedings of the IEEE/CVF conference on computer vision & pattern recognition, 2020. (9pgs).
Ha et al.,"HyperNetworks," in Proceedings of the International Conference on Learning Representations, 2017. (18pgs).
Lu et al.,"Cross-Modality Person Re-Identification With Shared-Specific Feature Transfer," in Proceedings of the IEEE/CVF Conference on Computer Vision & Pattern Recognition (CVPR), 2020. (11pgs).
Ning et al.,"DSA: More efficient budgeted pruning via differentiable sparsity allocation," in Proc. of the European Conference on Computer Vision, Springer, 2020. (16pgs).
Siddegowda et al.,"Neural Network Quantization with AI Model Efficiency Toolkit (AIMET)," arXiv preprint arXiv:2201.08442, 2022. (39pgs).
Tay et al.,"HyperGrid Transformers: Towards A Single Model for Multiple Tasks," in Proceedings of the International Conference on Learning Representations, 2021. (14 pgs).
Veličković et al.,"Graph Attention Networks," arXiv preprint arXiv:1710.10903, 2018. (12pgs).
Johannes von Oswald et al.,"Continual learning with hypernetworks," arXiv preprint arXiv:1906.00695, 2019. (16pgs).
Wang et al.,"Fully quantized image super-resolution networks," arXiv preprint arXiv:2011.14265, 2021. (12pgs).
Wang et al.,"Graph-Adaptive Pruning for Efficient Inference of Convolutional Neural Networks," arXiv preprint arXiv:1811.08589, 2018. (7pgs).
Wang et al.,"Post-OCR Paragraph Recognition by Graph Convolutional Networks," In Proc. of the IEEE/CVF Winter Conf. on Applications of Computer Vision, 2022. (10pgs).
Li et al.,"Automatic Channel Pruning with Hyper-parameter Search and Dynamic Masking," in Proceedings of the ACM International Conference on Multimedia, 2021. (9pgs).
Li et al.,"Pruning Filters for Efficient ConvNets," arXiv preprint arXiv:1608.08710, 2016. (9pgs).
Li et al.,"HTD: Heterogeneous Task Decoupling for Two-Stage Object Detection," IEEE Transactions on Image Processing, 2021. (14pgs).
Li et al.,"Group Sparsity: The Hinge Between Filter Pruning & Decomposition for Network Compression," in Proceedings of the IEEE/CVF conference on computer vision and pattern recognition, 2020. (10pgs).
Li et al.,"DHP: Differentiable Meta Pruning via HyperNetworks," in Proceedings of the European Conference on Computer Vision, 2020. (17pgs).
Li et al.,"Adaptive Feature Fusion via Graph Neural Network for Person Re-identification," in Proceedings of the ACM International Conference on Multimedia, 2019. (9pgs).
Lin et al.,"HRank: Filter Pruning using High-Rank Feature Map," in CVPR, 2020. (10pgs).
Liu et al.,"Learning Efficient Convolutional Networks through Network Slimming," in Proceedings of the IEEE International Conference on Computer Vision, 2017. (9pgs).
Liu et al.,"MetaPruning: Meta Learning for Automatic Neural Network Channel Pruning," in Proc. of the IEEE/CVF international conf. on computer vision, 2019. (10pgs).

* cited by examiner

AUTOMATIC CHANNEL PRUNING VIA GRAPH NEURAL NETWORK BASED HYPERNETWORK

CROSS-REFERENCE TO RELATED APPLICATION

This patent application is related to and claims priority benefit under 35 USC § 119(e) to and commonly-owned U.S. Pat. App. No. 63/241,095, filed on 6 Sep. 2021, entitled "AUTOMATIC CHANNEL PRUNING VIA GRAPH NEURAL NETWORK BASED HYPERNETWORK," and listing Baopu Li, Qiuling Suo, and Yuchen Bian as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for channel pruning in neural networks to increase network operation performance.

B. Background

Deep neural networks have achieved great successes in many domains, such as computer vision, natural language processing, recommender systems, etc. Model compression may be needed for large neural networks, e.g., a convolution neural network (CNN), to reduce computation overheads such that these networks may be deployed in resource limited devices without significant drop in accuracy.

Among model compression methods including model quantization, knowledge distillation, and tensor decomposition, channel pruning for CNN receives intensive attention for its directly removing redundant channels in a CNN while maintaining performance. Channel pruning is also more friendly to hardware compared to non-structural pruning approaches. Traditional channel pruning methods mainly rely on heuristic rule design. For example, a recursive procedure may include pre-training a model, removing unimportant channels based on rules, and fine-tuning the model. Therefore, they can be time-consuming and highly heuristic dependent.

Accordingly, what is needed are systems and methods for channel pruning in neural networks for improved efficiency and performance.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1A:
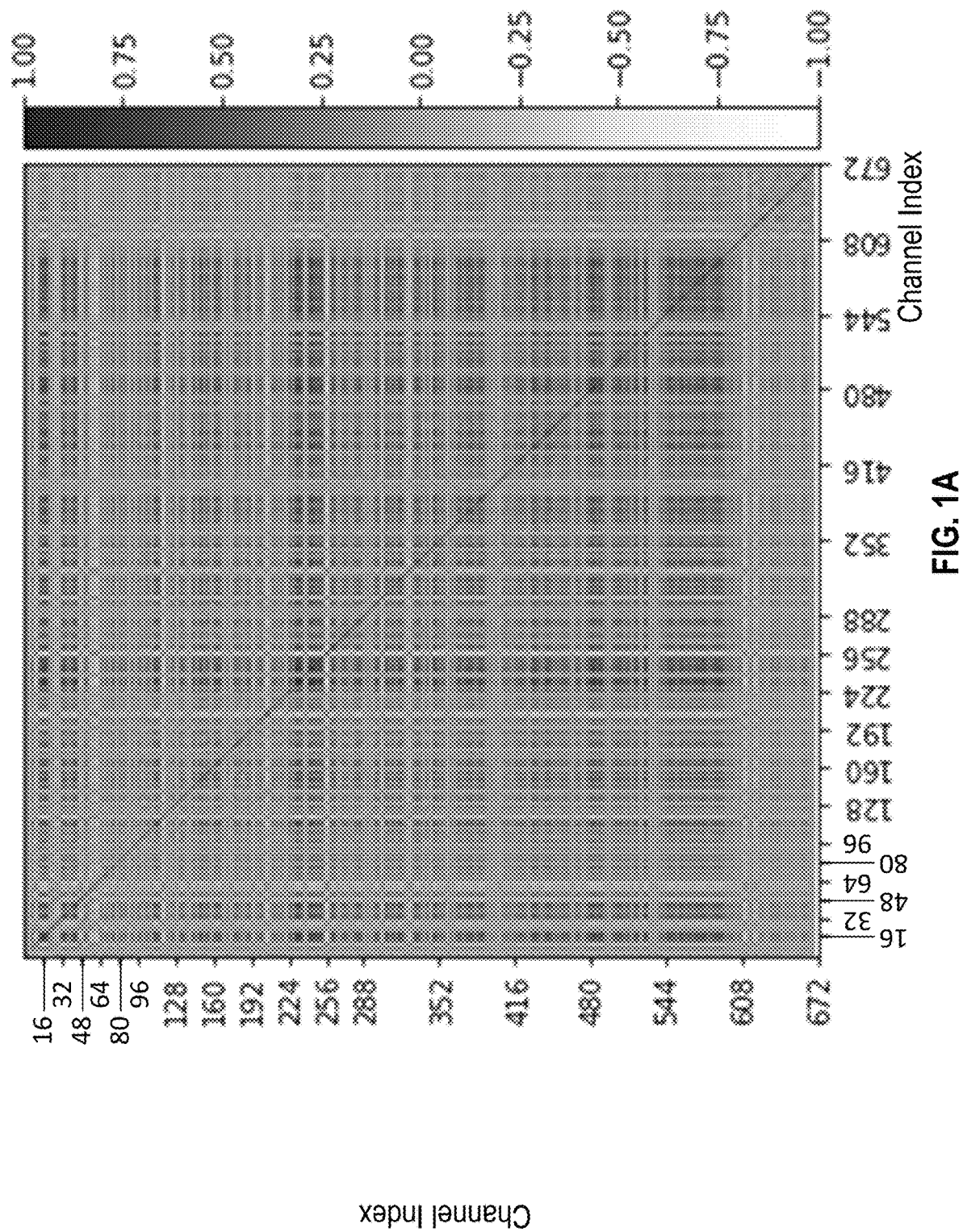
FIG. 1A ("FIG. 1A") depicts channel-wise cosine similarities of a neural network on a dataset, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Convolutional Neural Networks (CNNs) can be used as powerful modules for image and video understanding. However, their model sizes often tend to be large, resulting in intensive computational burdens. Compressing CNN models has the potential to enable more efficient deployment of CNN models on various platforms. (e.g., mobile phones and/or other resource-constrained devices). Among model compression methods including model quantization, knowledge distillation, and tensor decomposition, channel pruning for CNNs has received intensive attention for its ability to directly remove redundant channels in a CNN while maintaining desired performance. Channel pruning can also be friendlier to hardware compared to non-structural pruning approaches. Traditional channel pruning methods mainly rely on heuristic rule design. For example, a recursive procedure may include pre-training a model, removing unimportant channels based on rules, and fine-tuning the model. Therefore, traditional channel pruning methods are time-consuming and highly heuristic dependent. To overcome the inefficient recursive pruning and training, automatic machine learning and neural architecture search have emerged recently for a full end-to-end process.

For instance, based on meta-learning, some proposed a meta-pruning method that constructs a hypernetwork to generate weights for all candidate pruned architectures and achieved promising pruning results. However, to find the optimal pruned network, evolutionary algorithm (EA) is applied, which is computationally intensive. Others utilized latent vectors to control the output channels of a convolution layer, and build a hypernetwork based on the latent vectors to achieve differentiable meta-pruning. Despite such a hypernetwork avoids an extra searching step, the hypernetwork is constructed based on latent vectors associated with consecutive CNN layers, which only involves local relationships of a given CNN architecture. In the present patent document, it is asserted that global effects of all channels in all layers in the entire given architecture can benefit from model pruning, not only local effects of nearby CNN layers.

In one or more embodiments, an image classification task is taken using a CNN, e.g., a residual neural network (e.g., ResNet20), on an image dataset as an example to illustrate the global relationship among CNN channels. Feature maps of all CNN layers are first extracted from the three stages of the ResNet for randomly selected multiple images. In one or more embodiments, among 18 layers of the ResNet20, the first and last CNN layers of ResNet20 may be omitted for simplicity since these two layers are connected to input images and output class labels, respectively. One CNN layer is defined to contain $c_{out}$ channels, where $c_{out}$ is the output channel dimension. Then, influences between each pair of channels may be measured (e.g., with cosine similarity of their extracted feature maps). The cosine similarity results of channel-pairs in the 18 CNN layers are shown in FIG. 1A, where indices represent cumulative sum of the number of output channels. In one or more embodiments, for two sets of features with different dimensions of two channels, the feature with smaller dimension is interpolated to the same dimension of the other one. It is noticed that for an embodiment of ResNet20, high similarity areas exist in both nearby channels and remote ones (e.g., within Layer-11 and Layer-3, which are remote from each other, channels in Layer-11 (Channel-224 to 256) and channels in Layer-3 (Channel-32 to 48) have high similarity with each other. Some channels in early layers and deeper layers are more similar than channels in consecutive CNN layers. Therefore, it is demonstrated that both local and global relationships do exist among all channels in the entire model. In the present patent document, the similarities may also be visualized in a coarser level, i.e., layer level, by averaging similarities of all pairs of channels of two layers in FIG. 2. It may be noticed that local and global relationships also exist among CNN layers (e.g., Layer-3 and Layer-17 are highly correlated, though they are remote to each other).

Inspired by the observations, in the present patent document, one or more CNN architecture embodiments are represented as a connected graph to capture both local and global channel relationships. Embodiments of a Graph neural network (GNN) based Hypernetwork Pruning (GHP) methodology are presented to obtain optimal (i.e., improved) pruned CNNs automatically by extracting and aggregating local and global information.

In one or more embodiments, an information flow graph is first constructed from a given CNN architecture. The information flow graph may be built from CNN different from excising graph constructions where CNN operations are nodes. In one or more embodiments, CNN channels and/or layers are considered as nodes, and their structural connections (e.g., consecutive connections and residual connections) in the CNN architecture are considered as edges.

In one or more embodiments, a GNN is then utilized to update a node (e.g., CNN channels and/or layers) embeddings by capturing node dependencies of the entire architecture. GNNs have been verified with strengths of extracting local and global effects of non-structural graph data by aggregating node neighbors' influences. The updated embedding of a node may contain information from both nearby and distant nodes that are related to it. In one or more embodiments, GNN layers are stacked to make nodes affecting each other by neighbors' aggregation, even though two channel/layer nodes may be far apart from each other in the original CNN architecture.

The GNN and a multi-layer perceptron (MLP) hypernetwork may together form a graph hypernetwork, according to the present disclosure (e.g., a GNN based hypernetwork, or GHP). A hypernetwork may be used to generate parameter weights for different architectures. The GNN may be incorporated to more effectively control the network pruning process by yielding the network's weights and channel pruning masks at the same time.

New CNN architectures and convolution weights may thus be generated based on the updated embeddings (e.g., via a GHP). An indicator mask may be obtained for each CNN layer for channel selection. Node embeddings may be iteratively updated to generate new pruned CNNs, among which the CNN with the best validation performance may be chosen as the final pruned network.

Contributions of the present patent disclosure include at least the following:

(1) Embodiments of a novel GNN-based hypernetwork are disclosed to prune a given CNN architecture. Embodiments enable effective end-to-end pruning; the disclosed GHP embodiments can directly generate weights for pruned architectures so that their performance can be efficiently evaluated. The whole process may be performed end-to-end without extra searching efforts;

(2) Embodiments of graph construction and GNN aggregation are disclosed to help channel nodes and/or layer nodes influence each other to obtain globally informative channel and/or layer representative embeddings; and (3) Comprehensive experiments with different CNN models on various datasets validate the superior performance of the disclosed GHP methodology.

B. Some Related Work

1. Channel Pruning

Traditional channel pruning approaches generally apply different criteria such as accuracy change and loss change to evaluate filter importance in a CNN. Some propose approaches involved pruning unimportant filters in CNNs having small influences on the final accuracy. Others came up with the channel pruning by minimizing the reconstruction error on its output feature map. Yet others advanced a filter pruning scheme in light of its discrimination power. Yet others introduced loss and feature importance. Further, some suggested a channel pruning algorithm based on geometric median aiming for redundancy reduction. Others investigated the potential connection among filter pruning and matrix decomposition.

Later, automatic machine learning and neural architecture search (NAS) was extended to model pruning. Some introduced a data-driven sparse structure selection based on a modified stochastic accelerated proximal gradient method to enable end-to-end pruning. Transformable architecture search has been applied to differentiable filter pruning. Encouraging model compression performances were achieved with the aid of knowledge distillation. Others utilized differentiable Markov process and NAS to prune channels in a network.

2. Hypernetwork

Hypernetwork may be defined as a network to generate weights for another network. It has been applied in various applications, e.g., neural architecture search (NAS), continual learning, and multi-task learning. Some proposed a meta-pruning net applying hypernetwork in model pruning to generate and evaluate pruned networks, and others designed a differentiable pruning method by using latent vectors. However, those works may ignore the global influences among all CNN channels and layers in the entire architecture which are considered in the present patent disclosure.

3. Graph Neural Network

GNNs can effectively capture dependencies among nodes via aggregating neighboring information. GNN variants such as graph convolutional neural network (GCN), graph attention network (GAT), and GraphSAGE have been successfully applied in various computer vision related problems such as person identification, object detection, and optical character recognition. Such Graph neural networks (GNNs) have shown outstanding capability in various areas by effectively aggregating node neighbor information, such as social network, collaboration network, and bioinformatics. Recently, graph-based approaches have been leveraged for model pruning, such as by constructing a graph by considering operations in a CNN (e.g., normal convolution, batch norm, depth-wise convolution, activation, addition, and concatenation) as nodes and operation connections as edges (which can be computationally inefficient). Other schemes are based on GCN and rely on the reinforcement learning searching process to find the optimal architecture, which is computationally inefficient.

Graph construction in the GHP embodiments in the present patent document is different from and can be less complicated than the above graph-based pruning methods. According to the present disclosure, instead of defining nodes based on operations, nodes can be built of channels and layers, ignoring the operation level elements. For example, pursuant to pruning redundant channels in accordance with the present disclosure, it can be beneficial to build a graph that can directly learn channel dependencies. An operation-wise graph, in contrast, is not able to directly quantify channel dependencies, which can induce more cost in both graph building and pruning-related computations. In addition, GHP embodiments may automatically generate an optimally pruned CNN without any extra searching procedure.

It shall be noted that graph hypernetwork may also be applied in NAS, where some applied graph hypernetworks to search optimal building blocks from various candidate operations (which is different from channel pruning). Application of graph hypernetworks to NAS can involve building the graph on hypernetwork on potential structures that are randomly sampled, (e.g., in contrast with the graph structure of the GHP as presently disclosure, which can be directly built from information flow of channels and layers in an original or pretrained CNN).

C. Embodiments of GNN-Based Hypernetwork

Figure 2:
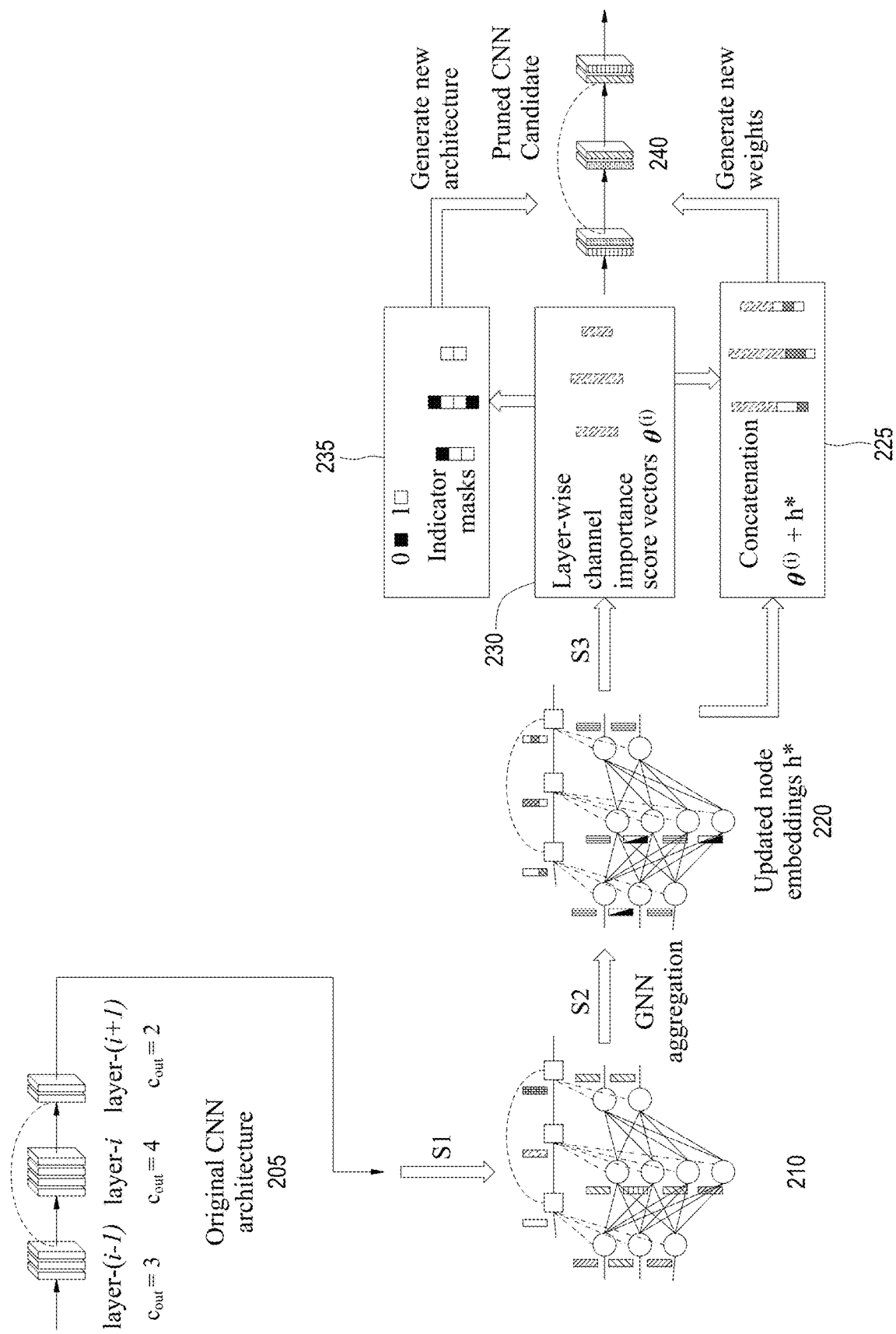
FIG. 2 depicts an overall pipeline of a graph neural network (GNN)-based hypernetwork framework, according to embodiments of the present disclosure.
Figure 3:
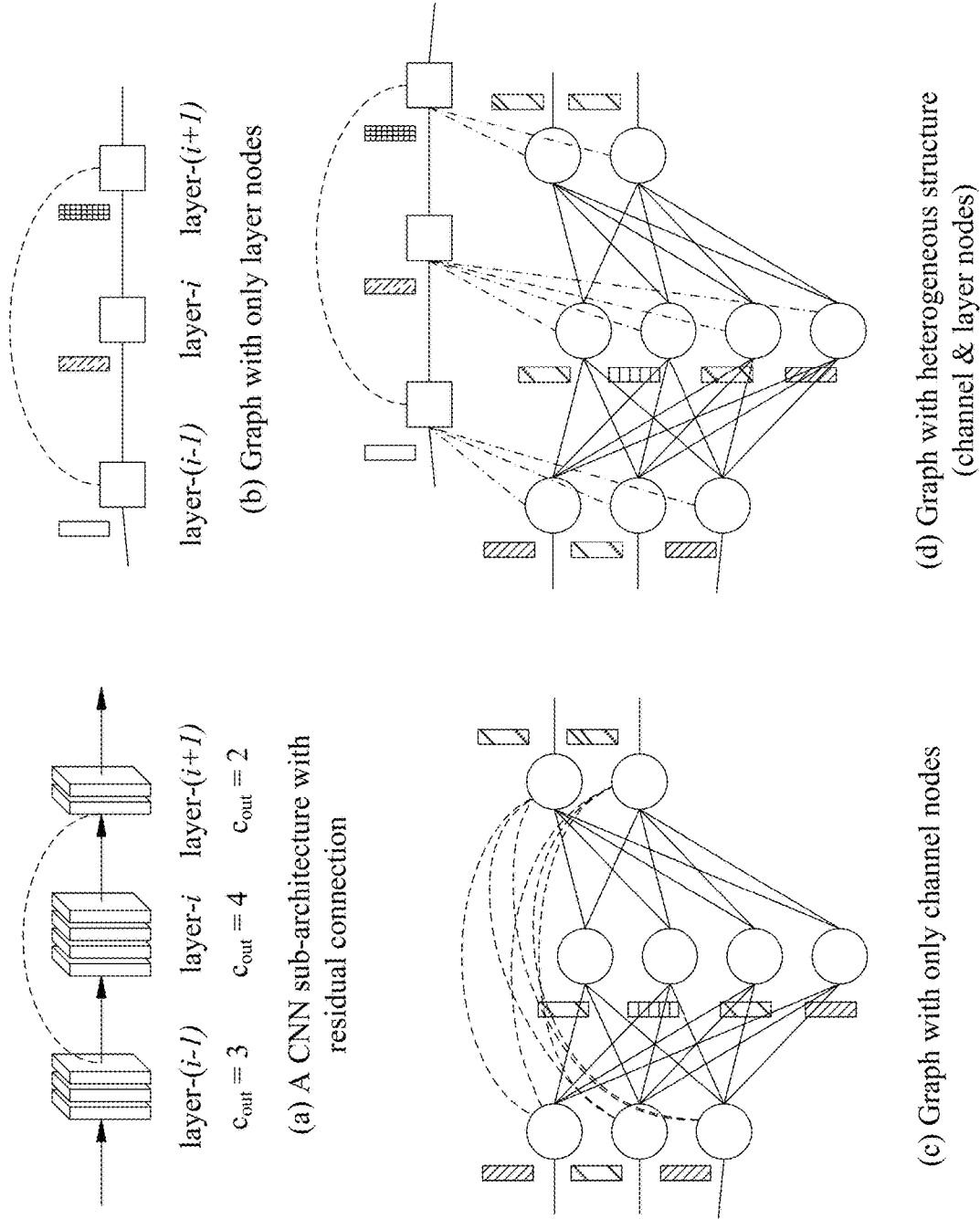
FIG. 3 depicts a CNN with three CNN layers and various information flow graphs, according to embodiments of the present disclosure.

In this section, embodiments of a GNN-based hypernetwork are elaborated for channel pruning. FIG. 2 depicts an overall pipeline of a GNN-based hypernetwork framework, according to embodiments of the present disclosure. By way of brief overview, in one or more embodiments, a GNN-based hypernetwork framework may comprise: (a) an information flow graph 210 constructed (S1) from a given network architecture such as an original CNN architecture 205 (e.g., a heterogeneous graph (d) as shown in FIG. 3 is used in the information flow graph 210 of FIG. 2 as an example with circles and squares representing channel and layer nodes, respectively, and bars near nodes representing initial node embeddings); (b) Updated node embeddings h* 220 that are updated via a GNN (S2) to aggregate local and global relationships to provide globally informative node embeddings (the GNN updates the initial node embeddings of the information flow graph 210, as indicated in FIG. 2 by the changes to the bars depicting the updated node embeddings 220 relative to the bars depicting the initial node embeddings of the information flow graph 210); and (c) Layer-wise channel importance score vectors $\theta^{(i)}$ 230 generated or obtained (S3) based at least on the updated node embeddings h* 220. In one or more embodiments, the score vectors $\theta^{(i)}$ 230 are further used to obtain channel indicator masks 235 by a pruning threshold (1/0 stands for keeping/pruning a channel, respectively) and generate new CNN weights 225 (e.g., via concatenation or addition of the score vectors $\theta^{(i)}$ with the updated node embeddings h* 230. A pruned network (e.g., a pruned CNN candidate 240) with the new architecture and weights may then be obtained based on the channel indicator masks 235 and the CNN weights 225 (the pruned CNN candidate 240 has different layer attributes than the original CNN architecture, as indicated in FIG. 2 by the different number of channels in each layer and the different visualizations of the channels indicating different channel weights for the pruned CNN candidate 240). This process may be optimized by minimizing the loss of each pruned network generated by the disclosed hypernetwork.

1. Information Flow Graph Construction Embodiments

In this subsection, multiple methods to construct a graph (e.g., an information flow graph 210 as discussed with reference to FIG. 2) for a given CNN architecture (e.g., a pretrained neural network) are disclosed. A constructed graph may comprise an undirected graph (e.g., in view of both feed-forward and back-propagation processes of CNNs). For the i-th CNN layer, its parameters may be denoted as $\mathcal{W}^{(i)} \in \mathbb{R}^{c_{out} \times c_{in} \times h \times w}$ where $c_{out}$ and $c_{in}$ are the numbers of output and input channels, respectively, and h×w is the kernel size. In one or more embodiments, the i-th CNN layer may be represented using two types of nodes: $c_{out}$ channel nodes and/or one layer node. Edges in the graph represent the information flow across CNN layers. A constructed information flow graph may thus comprise a node set (which may comprise layer nodes and/or channel nodes) and an edge set.

At least three kinds of information flow graphs with various sparsities may then be built. FIG. 3 illustrates a CNN sub-architecture (a) with three convolution layers to depict the example graph constructions (the dashed lines in FIG. 3 indicate residual connections). In some instances, only convolution layers are considered when constructing an information flow graph, and other components (e.g., batch normalization layer, pooling layer) may be ignored for simplicity.

Graph with only layer nodes ((b) in FIG. 3; a layer-wise graph). In one or more embodiments, one convolution layer of the CNN sub-architecture (a) may be represented with one layer node (e.g., the squares of the graph with only layer nodes (b) of FIG. 3 representing layer nodes). An edge connects two layer nodes if corresponding CNN layers are structurally connected (with consecutive connections indicated by the solid lines and with residual connections indicated by dashed lines). As noted above, the graph may be undirected due to feed-forward and back-propagation processes. The number of edges (reflecting the graph sparsity) can be denoted as O(|L|+|R|), where L={i|i-th layer} and R={(i,j)|i,j-th layers are connected with residual connections}.

Graph with only channel nodes ((c) in FIG. 3; a channel-wise graph). In one or more embodiments, one convolution layer of the CNN sub-architecture (a) may be represented with $c_{out}$ channel nodes (e.g., the circles of the graph with only channel nodes (b) of FIG. 3 representing channel nodes). Because the output of the (i−1)-th layer (e.g., $c_{in}$ channels) is the input of the i-th layer, every pair of channel nodes in the (i−1)-th layer and i-th layer may be connected. If two layers are consecutively or residually connected, an edge between each pair of channel nodes across the two layers may be added. The number of such bipartite edges between the two layers may be represented as $c_{in}c_{out}$. The total number of edges of the graph with only channel nodes (c) may be represented as $O(\Sigma_{i \in L} c_{in}^{(i)} c_{out}^{(i)} + \Sigma_{i,j \in R} c_{out}^{(i)} c_{out}^{(j)})$.

Graph with heterogeneous structure ((d) in FIG. 3; a channel-layer graph). In one or more embodiments, both channel and layer nodes may be taken into account, as shown in the graph with heterogeneous structure (d) in FIG. 3. A difference from the graph with only channel nodes (c) is that the residual connections among channel nodes (i.e., bipartite connections) are simplified with only one edge between two layer nodes. Furthermore, for each layer node, connections between the layer node and channel nodes within the layer node are added (shown as dot-dashed lines in the graph with heterogeneous structure (d) in FIG. 3). Compared to the graph with only channel nodes, the total number of edges reduces to $O(\Sigma_{i \in L}(c_{in}^{(i)} c_{out}^{(i)}) + |L| + |R|)$.

It shall be noted that computation complexity is different when using different graph constructions due to the graph sparsity.

2. Embodiments of GNN Node Embedding Aggregation

As noted above, GNNs may provide powerful capabilities to aggregate node neighbors' effects to obtain informative node embeddings for downstream tasks. At least some disclosed embodiments apply one or more GNNs to fuse node local and global influences across all layers of the input neural network (e.g., pretrained neural network to be pruned).

Various GNN variants may be utilized in accordance with the present disclosure, such as graph convolutional network (GCN), graph attention network (GAT), GraphSAGE (a general inductive framework for SAmple and aggreGatE), and/or others. At least some examples provided herein take GCN as an instance to show the aggregation process. A constructed information flow graph (e.g., as discussed above with reference to FIG. 3) may be represented as G=(N, E, $X^{(0)}$) where N and E are node and edge set, respectively, and $X^{(0)} \in \mathbb{R}^{|N| \times d}$ is the initial node embeddings with d dimensions. Initial node embeddings may be obtained in various ways such as by flattening weights of the pretrained neural network. By way of example, if only the architecture of the input pretrained neural network (e.g., the original CNN) is given, channel and/or layer node embeddings may be initialized by a learnable look-up embedding table. As another example, when pre-trained CNN weights are known, node embeddings may be generated from the known CNN channel/layer weights. Continuing with this example, for a channel node, the weights (E$\in \mathbb{R}^{c_{in} \times h \times w}$) may first be flattened and then passed through a fully-connected network layer to generate the node embedding. As for a layer node, the weights $\in \mathbb{R}^{c_{out} \times c_{in} \times h \times w}$) may similarly be flattened first. As yet another example, initial node embeddings may be randomly initialized or randomly assigned.

A denotes the adjacent matrix of G adding node self-loops, and D denotes the diagonal degree matrix of A. For the l-th GCN layer with parameter $W^{(l)} \in \mathbb{R}^{d \times d}$, the following equation may be obtained:

$$X^{(l+1)} = \sigma(D^{-0.5} A D^{0.5} X^{(l)} W^{(l)}) \quad (1)$$

In Equation (1), σ is a non-linear activation function such as rectified linear unit (ReLU). Intuitively, $D^{-0.5} A D^{0.5} X^{(l)}$ updates node embeddings by combining direct neighborhood information (e.g., local effects). By stacking multiple GCN layers, each node may reach any other node multi-hop away and/or even all nodes in the entire graph. As a result, global influences among nodes may be aggregated as well (e.g., global effects). In some instances, at this stage, no distinction may be made between layer nodes and channel nodes, and all node embeddings may be updated.

After GNN aggregation, the updated channel node embedding for channel k in the i-th layer of a CNN is denoted as $h_k^{(i)} \in \mathbb{R}^d$, and the updated layer node embedding for layer i is denoted as $h^{(i)} \in \mathbb{R}^d$. As an alternative GNN, compared to GCN, GAT assigns distinct contribution weights when aggregating neighborhood influences, and contribution weights of neighbor nodes are learned by adding attention network layers. GraphSAGE mixes node embeddings by a sampling and aggregation strategy from neighbors. It first samples multiple hops of neighbor node set, then aggregates neighbor embeddings with either simply averaging or forwarding through a network layer (e.g., pooling layer or LSTM layer).

3. Embodiments of Network Pruning

Through the aforementioned GNN learning process, node embeddings capture both local and global effects among channels and layers. Based on the node embeddings, layer-wise importance score vectors may be obtained. Then, for each layer, channel indicator masks and weights for a pruned network may be generated (e.g., step S3 in FIG. 2). In one or more embodiments, two branches are designed to effectively disentangle the learning for channel pruning and weights generation, respectively.

Channel Indicator Mask: For each CNN layer, with the embeddings obtained via GNN aggregation as discussed above, the importance of each channel may be weighed, and the unimportant channels may be pruned. For example, for the i-th convolution layer that contains $c_{out}$ channels, a fully connected (FC) layer (e.g., a multi-layer perceptron (MLP)) may be leveraged to transform its node embedding to a channel importance vector $\theta^{(i)} \in \mathbb{R}^{c_{out}}$. The channel importance vector quantifies the chance of each channel in the layer to be remained. For simplicity, the superscript (i) is omitted in the subsections.

For a channel-wise graph (e.g., graph with only channel nodes (c) in FIG. 3), θ may be computed by:

$$\theta = \tanh(W_c \otimes H + b_c) \quad (2)$$

In Equation (2), $W_c \in \mathbb{R}^{c_{out} \times d}$ and $b_c \in \mathbb{R}^{c_{out}}$ are learnable parameters, $\otimes$ is batched matrix multiplication, and tanh is used to scale the output value in range [−1, 1]. The embedding matrix $H = [h_1^T; h_2^T; \ldots; h_{c_{out}}^T] \in \mathbb{R}^{c_{out} \times d}$ stacks channel embeddings in the i-th layer, where $h_k \in \mathbb{R}^d$ is k-th channel embedding.

For a layer-wise graph (e.g., graph with only layer nodes (b) in FIG. 3), θ may be computed via normal matrix multiplication by:

$$\theta = \tanh(W_l h + b_l) \quad (3)$$

In Equation (3), $W_l \in \mathbb{R}^{c_{out} \times d}$ and $b_l \in \mathbb{R}^{c_{out}}$ are learnable parameter, and $h \in \mathbb{R}^d$ is the embedding vector of the node with respect to the i-th layer.

In one or more embodiments, θ may then be normalized min-max normalization for each layer to the range of [0, 1], i.e., θ←minmax(θ). Alternatively, Sigmoid function may be used to directly get the output ranging in [0, 1], although experimentation using both Sigmod and tanh+minmax showed that the latter performs better in at least some instances.

Channel indicator masks $M(\theta_k)$ may be obtained by binarizing the normalized vector θ with a given threshold to determine which channel to be remained in the layer. Specifically, $M(\theta_k)$ may be obtained by:

$$M(\theta_k) = \begin{cases} 0 & \theta_k < \gamma \\ 1 & \theta_k \geq \gamma \end{cases} \quad (4)$$

Here $\theta_k$ is the k-th element in the channel importance vector θ that indicates the probability of the k-th channel to be remained, and γ is a predefined threshold (e.g., a pruning threshold). The output of 0 means the corresponding channel is pruned, while the output of 1 means the corresponding channel is not pruned. In one or more embodiments, since the indicator mask $M(\theta_k)$ is non-differentiable, straight-through estimator (STE), a typical gradient estimation method to solve non-differentiable problems, may be used to enable gradient calculation in back-propagation by setting $$\frac{\partial \mathcal{L}}{\partial \theta_k} = \frac{\partial \mathcal{L}}{\partial M(\theta_k)},$$

where $\mathcal{L}$ is the loss function. In this way, a pruned architecture may be obtained by applying channel indicator masks for each layer.

Weights Generation: In one or more embodiments, in addition to generating the channel indicator mask for the pruned network, the disclosed GNN module may be used as a hypernetwork to generate new weights for the pruned network. With such generated weights, performance of various candidate pruned networks may be directly evaluated using validation data. The candidate pruned network with the best performance may be selected. Recalling that the parameter weight of the i-th convolution layer as $\mathcal{W}^{(i)} \in \mathbb{R}^{c_{out} \times c_{in} \times h \times w}$, a multi-layer perceptron (MLP) with two layers (or any number of layers) may be designed to generate the weight from the node embeddings h* and channel importance vector θ of the i-th layer as:

$$\mathcal{W}^{(i)} = \text{Reshape}(\text{MLP}(h^* \| \theta)) \quad (5)$$

In Equation (5), ∥ is the concatenation operator, "Reshape" means reshaping the output of MLP into the dimensions of the CNN layer $c_{out} \times c_{in} \times h \times w$. For the layer-wise graph (e.g., graph with only layer nodes (b) in FIG. 3), h* refers to the layer embedding vector h, and for the other two types of graphs (e.g., graph with only channel nodes (c) and graph with heterogeneous structure (d) in FIG. 3), h* refers to the channel embedding matrix H. According to the principle of hypernetwork, the output of Equation (5) are the weights for the i-th layer of the pruned network architecture.

4. Embodiments of Loss Function

In one or more embodiments, in the GHP-based pruning process, to achieve a good tradeoff between the model accuracy and model compression, the whole training target may be designated as:

$$\mathcal{L} = \mathcal{L}_{CE} + \lambda \mathcal{L}_{cost} \qquad (6)$$

In Equation (6), $\mathcal{L}_{CE}$ is a cross-entropy (CE) loss that controls the model prediction accuracy, $\mathcal{L}_{cost}$ controls the model compressionability, and λ is a factor to balance the above two terms (e.g., a trade-off factor). In one or more embodiments, $\mathcal{L}_{cost}$ may be defined as $$\left\| \left( 1 - \frac{\sum_i F^{(i)}}{\sum_i F_{ref}^{(i)}} \right) - \tau \right\|,$$

where τ is a predefined FLOPs pruning ratio and $F^{(i)}$ and $F_{ref}^{(i)}$ are the FLOPs of the i-th layer in a pruned network and original network without pruning, respectively. The FLOPs calculation of the i-th layer may be written as (with the superscript (i) omitted for simplicity):

$$F = h \cdot w \cdot c^*_{in} \cdot c^*_{out} \cdot h_M w_M \qquad (7)$$

In Equation (7), $c^*_{in}$ and $c^*_{out}$ are the number of input and output channels of the i-th layer of a pruned network, respectively. $c^*_{in}$ and $c^*_{out}$ may be computed by counting the number of 1 s in $M(\theta_k)$ of the (i−1)-th layer and i-th layer, respectively. $h_M$ and $w_M$ are the width and height of the output feature maps, respectively. The gradient calculation in the back-propagation process may be enabled through STE as noted hereinabove. Calculating $F_{ref}$ may be the same by replacing $c^*_{in}$ and $c^*_{out}$ with $c_{in}$ and $c_{out}$ in the original unpruned network (e.g., the input pretrained neural network).

D. Example Method Embodiments

For more clarity, an example method for pruning a neural network via GNN-based hypernetwork is shown below in Methodology 1. Through the training process, various pruned architectures may be generated and evaluated. In some instances, the training may be stopped when a given number of iterations are completed or when loss converges to a point that the architecture of the pruned network no longer changes. Finally, the architecture having the highest evaluation accuracy may be selected as the final pruned network. In one or more embodiments, the final pruned network may be retrained to further improve the performance.

Methodology 1 Model Pruning with GNN-based Hypernetwork

Inputs: Training set $\mathcal{T}_{train}$, validation set $\mathcal{T}_{val}$, original network without pruning, threshold γ, target FLOPs prune ratio τ.

Output: Final pruned network

1) Training
   1: Construct information flow graph G from the given original network, and initialize channel node and/or layer node embeddings.
   2: for number of iterations do
      3: Apply GNN on graph G via Equation (1), and obtain updated embeddings;
      4: Obtain channel importance vector via Equation (2) or Equation (3);
      5: Generate mask indicators and network weights via Equation (4) and Equation (5) respectively, to obtain a pruned network $\mathcal{A}$;
      6: Calculate classification loss regularized by cost constraint via Equation (6) for $\mathcal{A}$;
      7: Update trainable parameters of the hypernetwork (trainable parameters of Equation (1), Equation (2) or Equation (3), and Equation (5)) based on the loss;
      8: At the end of each epoch, evaluate $\mathcal{A}$ on $\mathcal{T}_{val}$ and store $\mathcal{A}$.
   9: end for
   10: Select the final architecture $\mathcal{A}^*$ as the one with the highest evaluation accuracy.
2) Retraining
   11: Train the obtained architecture $\mathcal{A}^*$ from scratch (e.g., train on training set $\mathcal{T}_{train}$ or other training dataset).

Figure 4A:
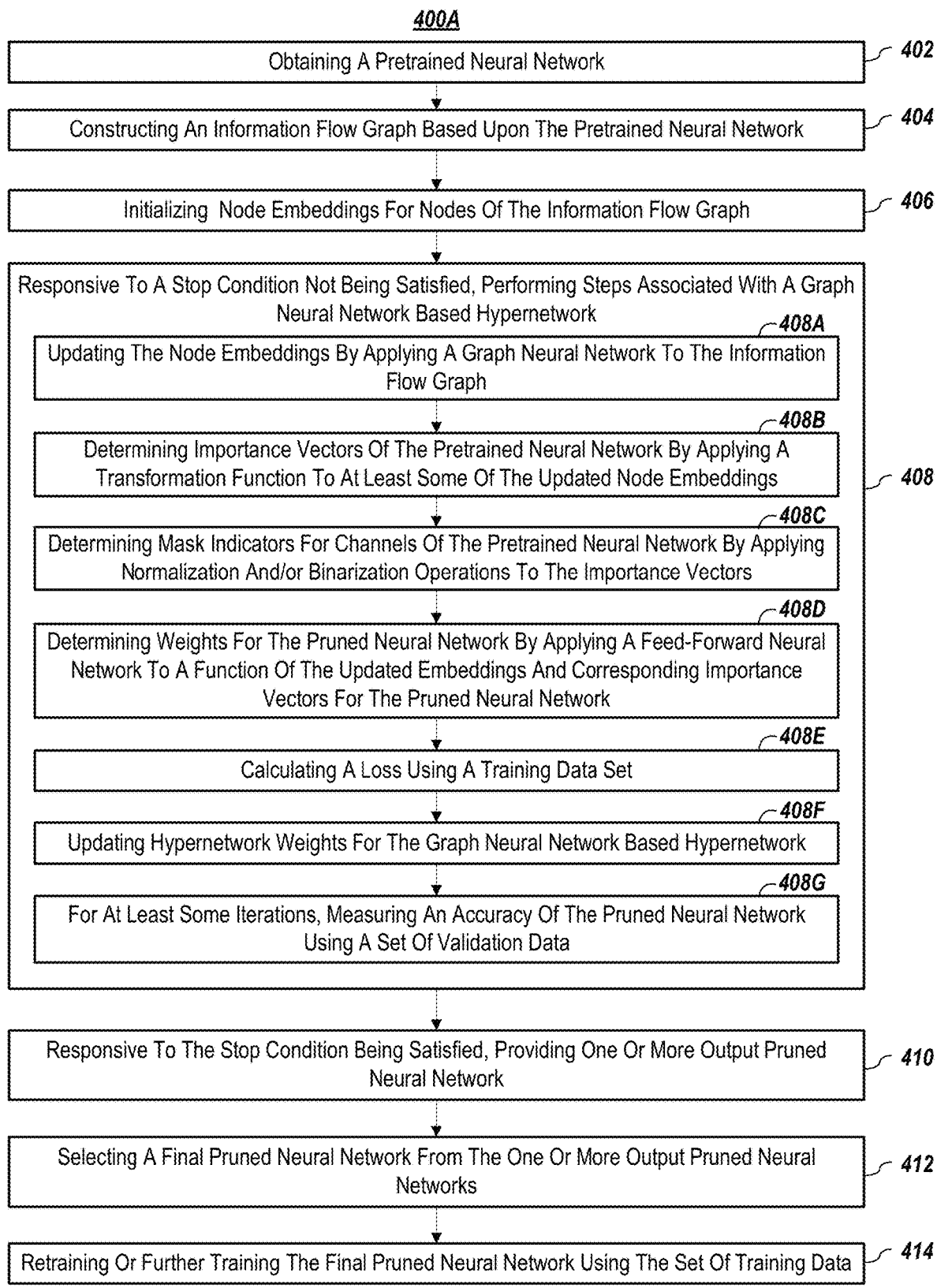
FIG. 4A depicts an example flow diagram showing acts associated with pruning a neural network via a GNN-based hypernetwork, according to embodiments of the present disclosure.

FIG. 4A depicts an example flow diagram 400A showing acts associated with pruning a neural network via a GNN-based hypernetwork, according to embodiments of the present disclosure. As noted above, (1) certain steps may optionally be performed; (2) steps may not be limited to the specific order set forth herein; (3) certain steps may be performed in different orders; and (4) certain steps may be done concurrently.

Act 402 of flow diagram 400A includes obtaining a pretrained neural network. In some instances, the pretrained neural network comprises a pretrained convolutional neural network (CNN), in accordance with the examples discussed hereinabove. Although the examples and/or experiments discussed herein focus, in at least some respects, on using CNNs to generate pruned CNNs, the principles discussed herein are not limited to CNNs and may be applied to generate other types of pruned neural networks. For instance, in some implementations, the pretrained neural network of act 402 comprises a pretrained transformer neural network. The channels discussed with reference to flow diagram 400A may correspond to attention heads in the case of transformer neural networks, and the layers discussed with reference to flow diagram 400A may correspond to transformer layers of transformer neural networks.

Act 404 of flow diagram 400A includes constructing an information flow graph based upon the pretrained neural network. The information flow graph may comprise a node set and an edge set. In some implementations, the node set of the information flow graph comprises layer nodes and/or channel nodes. For example, in some instances, the information flow graph may comprise a graph with only layer nodes ((b) in FIG. 3; a layer-wise graph), a graph with only channel nodes ((c) in FIG. 3; a channel-wise graph), or a graph with heterogeneous structure ((d) in FIG. 3; a channel-layer graph).

Act 406 of flow diagram 400A includes initializing node embeddings for nodes of the information flow graph. In some embodiments, initialized node embeddings for nodes of the information flow graph comprise randomly assigned embeddings or flattened weights of the pretrained neural network.

Act 408 of flow diagram 400A includes, responsive to a stop condition not being satisfied, performing steps associated with a graph neural network based hypernetwork. In some implementations, the stop condition comprises performance of a predetermined number of iterations. In some instances, one or more of the steps associated with act 408 may be performed during each iterative performance of the steps (e.g., during each iteration), or during fewer than all iterations (e.g., during each epoch only).

Step 408A of act 408 includes updating the node embeddings by applying a graph neural network to the information flow graph. The graph neural network (GNN) may take on various forms in accordance with the present disclosure. For example, the GNN may comprise a GCN (e.g., in accordance with Equation (1)), a GAT, or a GraphSAGE algorithm. The updated embeddings may advantageously aggregate global influences among the nodes of the information flow graph.

Step 408B of act 408 includes determining importance vectors of the pretrained neural network by applying a transformation function to at least some of the updated node embeddings. In some implementations, the transformation function comprises a hyperbolic tangent of a function of at least the updated node embeddings and one or more learnable parameters. For example, the transformation function may be implemented in accordance with Equation (2) (e.g., for channel-wise information flow graphs) or Equation (3) (e.g., for layer-wise information flow graphs), where, for Equation (2), $W_c \in \mathbb{R}^{c_{out} \times d}$ and $b_c \in \mathbb{R}^{c_{out}}$ are learnable parameters and $H=[h_1^T; h_2^T; \ldots ; h_{c_{out}}^T] \in \mathbb{R}^{c_{out} \times d}$ is an embedding matrix comprising the updated node embeddings, and, for Equation (3), $W_l \in \mathbb{R}^{c_{out} \times d}$ and $b_l \in \mathbb{R}^{c_{out}}$ are learnable parameters and $h \in \mathbb{R}^d$ is the embedding vector of the node with respect to the i-th layer.

Step 408C of act 408 includes determining mask indicators for channels of the pretrained neural network by applying normalization and/or binarization operations to the importance vectors. The mask indicators may indicate which of the channels of the pretrained neural network to prune to obtain a pruned neural network (or which of the channels to retain to obtain the pruned neural network). In some instances, the normalization operation comprises a minmax normalization operation (e.g., to normalize the importance vectors to a range of [0, 1]). In some implementations, the binarization operation is implemented in accordance with Equation (4), where γ is a pruning threshold.

Step 408D of act 408 includes determining weights for the pruned neural network by applying a feed-forward neural network to a function of the updated embeddings and corresponding importance vectors for the pruned neural network. The feed-forward neural network may comprise a multilayer perceptron (MLP) for determining the weights from at least some of the updated node embeddings and the at least some of the importance vectors. For instance, the feed-forward neural network may be implemented in accordance with Equation (5). Although the function of the updated embeddings and the importance vectors in Equation (5) comprises a concatenation h* with the corresponding importance vector θ, h* may be combined with θ in other ways, such as by addition.

In some implementations, in view of Equation (5), determining the weights for the pruned neural network may comprise reshaping output of the multilayer perceptron into dimensions of the pruned neural network (e.g., via "Reshape").

Step 408E of act 408 includes calculating a loss using a training data set. The loss represents a cross-entropy loss for the pruned neural network and a compressionability loss (e.g., in accordance with Equation (6)). In some instances, the compressionability loss is based upon a predefined FLOPs pruning ratio (e.g., defined as $$\left\| \left(1 - \frac{\sum_i F^{(i)}}{\sum_i F_{ref}^{(i)}}\right) - \tau \right\|,$$

where τ is a predefined FLOPs pruning ratio and $F^{(i)}$ and $F_{ref}^{(i)}$ are the FLOPs of the i-th layer in a pruned network and the pretrained neural network, respectively. The FLOPs calculation of the i-th layer may be represented in accordance with Equation (7).

Step 408F of act 408 includes updating hypernetwork weights for the graph neural network based hypernetwork. The hypernetwork weights may be updated during backpropagation. In some embodiments, the hypernetwork weights may comprise weights for the GNN (e.g., of step 408A), weights for the transformation function (e.g., of step 408B), and weights for the feed-forward neural network (e.g., of step 408D).

Step 408G of act 408 includes, for at least some iterations, measuring an accuracy of the pruned neural network using a set of validation data. Measurement of pruned neural network accuracy may be performed according to any predefined structure, such as for every iteration, for every n-th iteration, for every epoch, etc. The pruned neural networks for which accuracy is measured may comprise candidate pruned neural networks (e.g., that become outputted in accordance with act 410 discussed below) from which a final pruned neural network is chosen (e.g., according to act 412).

Act 410 of flow diagram 400A includes, responsive to the stop condition being satisfied, providing one or more output pruned neural networks. The one or more output neural networks may comprise the candidate pruned neural networks for which accuracy was measured in accordance with step 408G of act 408. Act 412 of flow diagram 400A includes selecting a final pruned neural network from the one or more output pruned neural networks. The final pruned neural network may be associated with a highest accuracy (e.g., as measured in accordance with step 408G of act 408).

Act 414 of flow diagram 400A includes retraining or further training the final pruned neural network using the set of training data. Such training may, in some instances, further improve the accuracy and/or performance of the final pruned neural network.

Figure 4B:
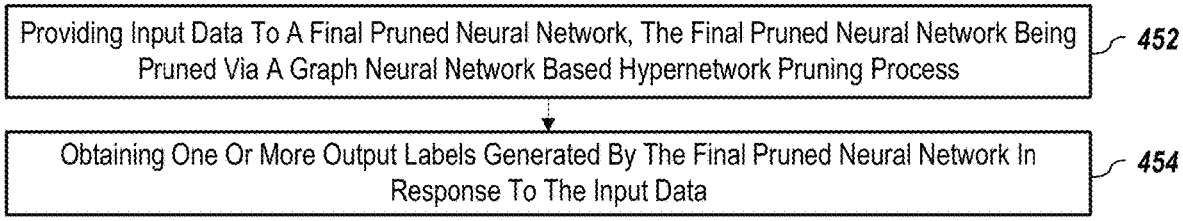
FIG. 4B depicts an example flow diagram showing acts associated with using a pruned neural network that was pruned via a GNN-based hypernetwork, according to embodiments of the present disclosure.

FIG. 4B depicts an example flow diagram 400B showing acts associated with using a pruned neural network that was pruned via a GNN-based hypernetwork, according to embodiments of the present disclosure.

Act 452 of flow diagram 400B includes providing input data to a final pruned neural network, the final pruned neural network being pruned via a graph neural network based hypernetwork pruning process. The graph neural network based hypernetwork pruning process for pruning the final pruned neural network of act 452 may comprise performance of one or more acts discussed hereinabove with reference to flow diagram 400A. For example, the pruning process may include: obtaining a pretrained neural network (e.g., act 402) such as a pretrained CNN or a pretrained transformer neural network; constructing an information flow graph that includes a node set and an edge set based upon the pretrained neural network (e.g., act 404); initializing node embeddings for nodes of the information flow graph (e.g., act 406); responsive to a stop condition not being satisfied, performing steps associated with a graph neural network based hypernetwork (e.g., act 408 including steps of: updating the node embeddings by applying a graph neural network to the information flow graph (e.g., step 408A); determining importance vectors of the pretrained neural network by applying a transformation function to at least some of the updated node embeddings (e.g., step 408B); determining mask indicators for channels of the pretrained neural network by applying normalization and/or binarization operations to the importance vectors (e.g., step 408C); determining weights for the pruned neural network by applying a feed-forward neural network to a function of the updated embeddings and corresponding importance vectors for the pruned neural network (e.g., step 408D); calculating a loss using a training data set (e.g., step 408E); updating hypernetwork weights for the graph neural network based hypernetwork (e.g., step 408F); and, for at least some iterations, measuring an accuracy of the pruned neural network using a set of validation data (e.g., step 408G)); responsive to the stop condition being satisfied, providing one or more output pruned neural networks (e.g., act 410); selecting the final pruned neural network from the one or more output pruned neural networks (e.g., act 412); and retraining or further training the final pruned neural network using the set of training data (e.g., act 414).

Act 454 of flow diagram 400B includes obtaining one or more output labels generated by the final pruned neural network in response to the input data. In some implementations, the pruning of the final pruned neural network via the graph neural network based hypernetwork pruning process contributes to a reduced inference time for generating the one or more output labels by the final pruned neural network in response to the input data relative to an inference time associated with generating one or more corresponding output labels by the pretrained neural network in response to the input data (e.g., as discussed hereinbelow under the section entitled "Inference Time Comparison").

E. Some Experiments

To validate performance of the disclosed GHP, extensive experiments were carried out on CIFAR10, CIFAR100, and Dataset 3 datasets with different network structures, including various residual neural networks (ResNet) with different number of layers, and one or more other types of networks.

It shall be noted that these experiments and results are provided by way of illustration and were performed under specific conditions using a specific embodiment or embodiments; accordingly, neither these experiments nor their results shall be used to limit the scope of the disclosure of the current patent document.

1. Implementation Details

The tests are implemented using PyTorch and NVIDIA V-100 GPU. The threshold $\gamma$ for determining remaining channels in Equation (4) is set as 0.5 for all experiments. Other hyperparameters, such as batch size and embedding dimension, are found through grid search. As for GNN, two layers of GNN are utilized for all the experiments since it is found that a two-layer design can achieve a good trade-off between accuracy and computation burden. In the training phase, the initial learning rate is set to 0.1, momentum to 0.9, weight decay to 1e-4, batch size to 256, and SGD optimizer is used. Cosine annealing is used to decrease the learning rate dynamically, and to train 200 epochs in maximum. An early stopping strategy is used when the pruned architecture with the highest accuracy does not change for certain epochs (e.g., 10 epochs in the implementation). After the training phase, the obtained pruned network is then retrained from scratch. For CIFAR10 and CIFAR100, the batch size is set to 128, a cosine annealing scheduler is used, and training proceeds for 200 epochs. For Dataset 3, batch size is set to 256, training proceeds for 100 epochs, and the learning rate is decayed by 10 percent every 30 epochs.

2. Ablation Studies

At least some of the disclosed embodiments are verified by performance of ablation studies conducted on two aspects: (i) the way of graph constructions and (ii) the choice of GNN models. For illustrative purpose only, the ablation experiments are designed with ResNet20 on CIFAR10 dataset.

TABLE 1

Ablation study on CIFAR10 for ResNet20 with different graph construction methods

| Method | Accuracy | AD | FPR |
|---|---|---|---|
| Channel-wise | 90.34% | 1.76% | 55.00% |
| Layer-wise | 91.51% | 0.59% | 55.00% |
| Channel-Layer | 91.24% | 0.87% | 55.00% |

Graph Constructions: The effectiveness of different graph constructions described herein including layer-wise graph, channel-wise graph, and channel-layer graph are tested. GCN is used as the node aggregation method for the three types of constructed graphs. Results with ResNet20 on CIFAR10 datasets are shown in Table 1, where AD represents accuracy drop and FPR represents the FLOPs pruning ratio compared to the original ResNet20. As is evident from Table 1, the use of different graph construction methods does not appear to affect the model pruning performance, much especially for the case of layer-node only and its combination with channel nodes. Considering the extra graph density introduced by channel nodes and the additional computational burden, in subsequent tests, a layer-wise graph based GNN hypernetwork is applied.

TABLE 2

Ablation study on CIFAR10 for ResNet20 with different GNN variants for learning node embeddings

| Graph Type | Accuracy | AD | FPR |
|---|---|---|---|
| No GNN | 90.94% | 1.26% | 50.00% |
| GAT | 91.56% | 0.64% | 50.00% |
| GCN | 91.87% | 0.33% | 50.00% |
| GraphSAGE | 91.71% | 0.39% | 50.00% |

GNN Choices: Different GNN variants including GAT, GCN, and GraphSAGE, are applied separately to encode node information using the layer-wise graph approach for model pruning to show the effects of the different GNN variants on model pruning. Performances of the pruned architectures obtained via the three GNN variants are shown in Table 2. For the 'No GNN' method, the node embeddings were randomly initialized and used to generate a new architecture and associated weights, without applying GNN to update node embeddings. As illustrated in Table 2, when no GNN is applied, the performance of pruning is inferior to those of with GNN aggregation. This may be due to the fact that the 'no GNN' method cannot effectively learn channel embeddings, ignoring channel relationships when generating pruned architectures and resulting in a less effective pruning result. This validates the benefits of applying GNN-based hypernetwork to aggregate channel relationships for network pruning. In addition, it does not appear that great variations exist in pruning performance for different GNN models. Table 2 also shows that GCN-based GHP model demonstrates higher accuracy and efficiency compared to GAT and GraphSAGE when applying the same FPR. Therefore, GCN is used as the main type of GNN in the following experiments.

3. Comparison Tests on CIFAR10

The CIFAR10 dataset is a common dataset including 60000 images for ten classes each of which has 6000 images. It has been widely tested for image classification tasks. Embodiments of GHP were compared to some typical methods such as filter pruning via geometric median (FPGM), the method of channel pruning (CP), soft filtering pruning (SFP), automated deep compression (AMC), High Rank of feature maps (HRank), Variational approach, Discrete Model Compression (DMC), and Differentiable meta pruning (DHP). It shall be noted that comparisons are mainly among the filter pruning related methods since GHP belongs to the same category. Moreover, comparisons are not made to knowledge distillation related methods or knowledge distillation-enhanced pruning approaches which are classified in different categories. ResNet20, ResNet32, ResNet56, and Other Network are utilized as examples to illustrate the effectiveness.

TABLE 3

Comparisons of different pruning methods on CIFAR10

| Model | Method | Accuracy | AD | FPR |
|---|---|---|---|---|
| ResNet20 | SFP | 90.83% | 1.37% | 42.20% |
| ResNet20 | FPGM | 91.09% | 1.11% | 42.20% |
| ResNet20 | DHP | 91.54% | 0.66% | 48.20% |
| ResNet20 | GHP (Presented) | 91.87% | 0.33% | 50.00% |
| ResNet32 | SFP | 92.08% | 0.59% | 41.50% |
| ResNet32 | FPGM | 92.31% | 0.32% | 41.50% |
| ResNet32 | GHP (Presented) | 92.92% | −0.29% | 50.00% |
| ResNet56 | CP | 91.80% | 1.00% | 50.00% |
| ResNet56 | AMC | 91.90% | 0.90% | 50.00% |
| ResNet56 | SFP | 93.13% | 0.24% | 52.60% |
| ResNet56 | FPGM | 93.49% | 0.10% | 52.60% |
| ResNet56 | Hrank | 93.17% | 0.09% | 50.00% |
| ResNet56 | DHP | 93.58% | 0.01% | 49.04% |
| ResNet56 | DMC | 93.69% | −0.07% | 50.00% |
| ResNet56 | GHP (Presented) | 93.73% | −0.34% | 52.90% |
| Other Network | Variational | 93.38% | 1.00% | 45.00% |
| Other Network | GHP (Presented) | 93.84% | 0.54% | 56.00% |

Pruning results in terms of accuracy, accuracy drop (AD) and FLOPs pruning ratio (FPR, higher values mean less computation loads) are summarized in Table 3 (best performances are emphasized in bold font). It shall be noted that the baseline models (i.e., original models without channel pruning) run in different environment show slight differences. Therefore, AD is taken as a more objective performance measurement to evaluate different model pruning methodologies. For ResNet20, embodiments of the presented GHP method produce much lower classification AD with a higher FPR of 50%. As for ResNet32, GHP can even increase the classification performance by 0.29% when the whole model's FLOPs are pruned by 50%. For ResNet56, embodiments of the presented GHP method also outperform other methods such as CP, AMC, SFP, FPGM, Hrank, DMC and DHP. For Other Network, embodiments of the presented GHP method have higher accuracy and less AD with higher FPR compared to Variational method.

It appears that the promising effectiveness that GHP embodiments deliver results from both local and global channel/layer relationships extracted by GNN in the information flow graph representation of CNN architecture, which are ignored by existing methods.

4. Comparison Tests on CIFAR100

CIFAR100 is another common benchmark dataset. It is an extension of CIFAR10, and it contains 100 classes consisting of 600 images for each class. In this section, ResNet20, ResNet32, ResNet56 are taken to exhibit performances of image classification on CIFAR100. The methods of SFP and FPGM mentioned above are taken for comparison since they directly reported related models' pruning performances.

TABLE 4

Comparison of different schemes on CIFAR100

| Model | Method | Accuracy | AD | FPR |
|---|---|---|---|---|
| ResNet20 | SFP | 64.37% | 3.25% | 42.20% |
| ResNet20 | FPGM | 66.86% | 0.76% | 42.20% |
| ResNet20 | GHP (Presented) | 67.02% | 0.05% | 45.00% |
| ResNet32 | SFP | 68.73% | 1.40% | 41.50% |
| ResNet32 | FPGM | 68.52% | 1.25% | 41.50% |
| ResNet32 | GHP (Presented) | 69.73% | 0.04% | 45.00% |
| ResNet56 | SFP | 68.79% | 2.61% | 52.60% |
| ResNet56 | FPGM | 69.66% | 1.75% | 52.60% |
| ResNet56 | GHP (Presented) | 70.36% | 0.48% | 55.00% |

Comparison results are shown in Table 4. On ResNet20, compared to SFP and FPGM, the GHP embodiment demonstrates a superior classification accuracy of 67.02% with a much lower AD of 0.05% and a better FPR of 45.00%. While on ResNet32, the presented GHP embodiment achieves better accuracy of 69.73% than those of SFP and FPGM. Meanwhile, the presented GHP embodiment achieves a higher pruning ratio of 45.00% for ResNet32. As for ResNet56, a higher accuracy of 70.36% and a much less AD of 0.48% with an impressive FPR of 55.00% are observed for the presented GHP embodiment.

Hence, Ads for the presented GHP embodiment are also much decreased in contrast to the prior schemes together with a higher FPR for ResNet20, ResNet32 and ResNet56 on CIFAR100, which further demonstrates the advanced performance and the efficacy of the disclosed GHP method.

5. Comparison Tests on Dataset 3

To further illustrate the efficacy of the disclosed GHP, Database 3 based experiments are implemented with ResNet34 and ResNet50.

TABLE 5

Channel pruning results on Dataset 3

| Model | Method | AD | FPR |
|---|---|---|---|
| ResNet34 | SFP | 2.09% | 41.10% |
| ResNet34 | FPGM | 1.38% | 41.10% |
| ResNet34 | GHP (Presented) | 1.28% | 30.00% |
| ResNet50 | SFP | 1.54% | 41.80% |
| ResNet50 | FPGM | 1.68% | 42.20% |
| ResNet50 | HRANK | 1.17% | 43.70 |
| ResNet50 | GHP (Presented) | 0.51% | 45.00% |

The classification results for Dataset 3 using ResNet34 and ResNet50 are shown in Table 5. It may be observed that the presented GHP embodiment shows promising pruning ratio together with encouraging AD for both ResNet34 and ResNet50 on Dataset 3. Specifically, for ResNet50, the presented GHP embodiment achieves better FPR (45%) and AD (0.51%) at the same time compared to some typical methods such as SFP, FPGM and Hrank.

6. Effects of Pruning Ratio

The experiments discussed above provide comparisons under specific pruning ratios. This section illustrates performance of ResNet50 on Dataset 4 under various pruning ratios to illustrate the effects of pruning ratio. Dataset 4 is a subset of Dataset 3 with a resolution of 64×64 pixels.

TABLE 6

Pruning performance for ResNet50 with different pruning ratios on Dataset 4

| FPR | 0.40 | 0.45 | 0.50 | 0.55 | 0.60 |
|---|---|---|---|---|---|
| Accuracy | 64.97% | 64.89% | 64.87% | 64.26% | 64.18% |
| AD | 0.07% | 0.15% | 0.17% | 0.78% | 0.86% |

The results are shown in Table 6. As is evident from Table 6, GHP appears to maintain a rather stable AD within 1% for different pruning ratios from 0.40 to 0.60. such a stable pruning performance may be attributable to the disclosed GNN hypernetwork that can effectively control the pruning process, as will be discussed in more detail hereinafter.

7. Effects of Different Threshold of $\gamma$

The experiments discussed provide comparisons based on setting the threshold value of $\gamma$ in Equation (4) to 0.5. $\gamma$ may be regarded as the confidence threshold for keeping a channel or not. This section investigates the influences of the hyperparameter $\gamma$.

TABLE 7

Pruning performance for ResNet20 with different threshold on CIFAR10 dataset with pruning ratio of 50%

| $\gamma$ | 0.70 | 0.50 | 0.30 |
|---|---|---|---|
| Accuracy | 91.51% | 91.87% | 91.10% |
| AD | 0.39% | 0.03% | 0.80% |

Experiments are performed with $\gamma=0.7$, $\gamma=0.5$ and $\gamma=0.3$. The performance is shown in Table 7. The results shown in Table 7 indicate that the disclosed techniques exhibit rather stable pruning performance with respect to different $\gamma$ since their AD appear to maintain stability.

8. Inference Time Comparison

Model pruning generally leads to a speedup in inference time. To verify this for the disclosed techniques, tests are carried out using a Nvidia-GPU V100*1. For illustrative purpose only, the inference time of models such as ResNet18, ResNet20, ResNet32, ResNet56 and their corresponding GHP-pruned models are recorded along with FPR on CIFAR10 and/or Dataset 3 to show the inference speed boost.

TABLE 8

Inference time comparison on CIFAR10

| Dataset | Model | Avg. Inference Time (s) |
|---|---|---|
| CIFAR10 | ResNet20 | 4.297 |
| CIFAR10 | ResNet20 (Pruned) | 3.875 |
| CIFAR10 | ResNet32 | 4.427 |
| CIFAR10 | ResNet32 (Pruned) | 4.058 |
| CIFAR10 | ResNet56 | 4.803 |
| CIFAR10 | ResNet56 (Pruned) | 4.281 |

The average inference times of the original and pruned models are listed in Table 8 where 'Inference Time' is for the whole inference process of all the 10,000 CIFAR10 test images (resolution 32×32) averaged over 10 runs. As is evident from Table 8, the pruned models appear to increase the inference speed. For ResNet20, ResNet32 and ResNet56, the average inference speed of the pruned model can increase by about 9.82%, 8.33%, 10.86%, respectively, over the original models, demonstrating the practical benefits of the disclosed GHP framework. The inference time reduction is not necessarily directly proportional to the FLOPs reduction due to other factors such as hardware, task schedules, and/or others.

TABLE 9

Inference time comparison per Dataset 3

| Dataset | Model | Avg. Inference Time (ms) |
|---|---|---|
| Dataset 3 | ResNet18 | 0.858 |
| Dataset 3 | ResNet18 (Pruned) | 0.626 |
| Dataset 3 | ResNet34 | 0.991 |
| Dataset 3 | ResNet34 (Pruned) | 0.680 |
| Dataset 3 | ResNet50 | 1.250 |
| Dataset 3 | ResNet50 (Pruned) | 0.832 |

For Dataset 3, each image (resolution 224×224) is separately compared, and the results are shown in Table 9. As is evident from Table 9, it can be noted that for each image inference time for Dataset 3, the time is reduced by 27.04%, 32.38%, 33.45%, respectively for ResNet18, ResNet34 and ResNet50 (as compared to the original models), amounting to a promising speed increase on Dataset 3 (e.g., as compared to the speed increase exhibited for CIFAR10; a potential reason being that the pruned model can accumulate the speedup effects on larger images compared to the smaller resolution images in CIFAR10). It should be noted that the inference speed may be affected by other factors such as memory, CUDA version, and/or others.

9. Discussions

Figure 5:
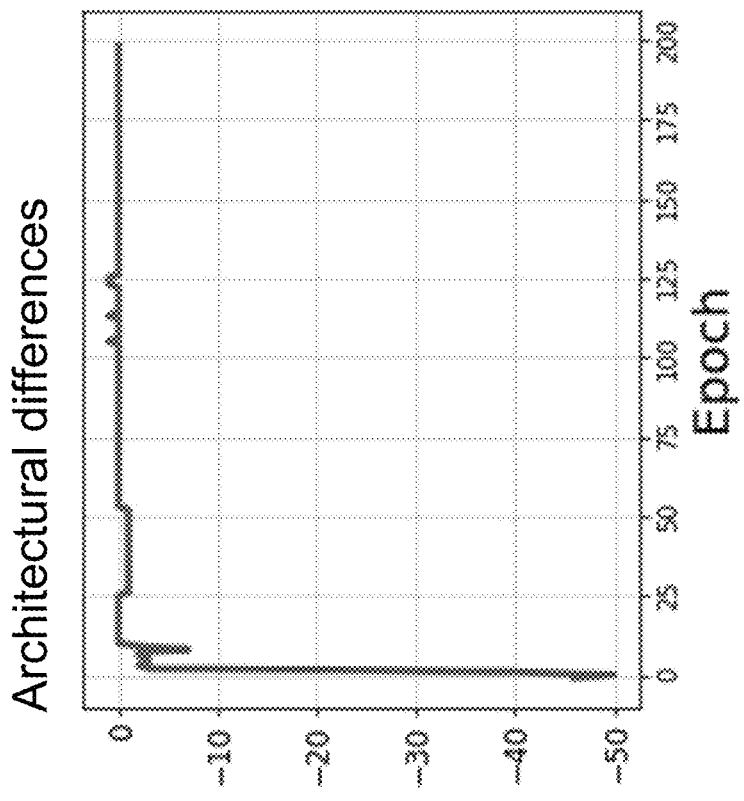
FIG. 5 depicts changes of loss and architecture differences with respect to optimal architecture during training, according to embodiments of the present disclosure.
Figure 5:
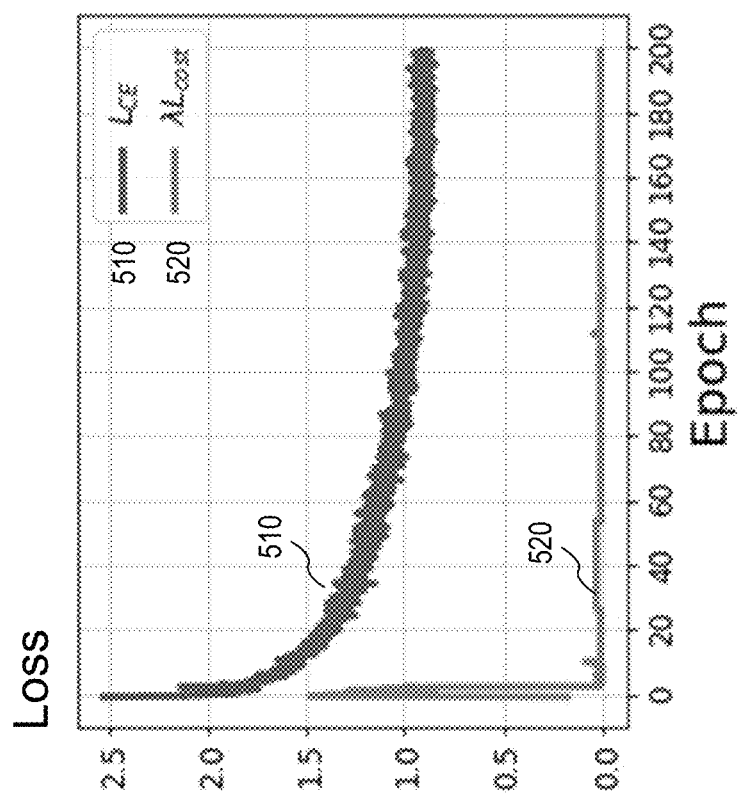

Fast convergence: Efficiency of pruning process of the disclosed GNN-based hypernetwork GHP is analyzed. It is found that, in at least some instances, the optimal architectures may be obtained in a very early stage. In some instances, dominant loss reduction in the further training process(es) is mainly on $\mathcal{L}_{CE}$ 510, while $\lambda \mathcal{L}_{cost}$ 520 (see FIG. 5) is almost zero since the found architecture has met the target pruning ratio. Both losses are plotted in FIG. 5, using ResNet20 on CIFAR10 as an example. As shown in FIG. 5, the target pruning ratio may be met at as early as 4 epochs, and then $\mathcal{L}_{CE}$ may continue to decrease in following epochs.

FIG. 5 also depicts the changes in generated architectures measured by the absolute difference between the evolving channel numbers and the optimal pruned channel numbers. FIG. 5 shows that, in at least some instances, more channels are aggressively pruned in the early stages. After the breakthrough point of $\mathcal{L}_{cost}$ shown in the loss subfigure in FIG. 5, more channels are added back. Then architectures modification tends to be very small. This demonstrates the fast convergence of GHP in finding optimal architectures. After that, the training loss (dominated by $\mathcal{L}_{CE}$) forces generation of better weights for the architecture with the best performance on the validation set.

Figure 1B:
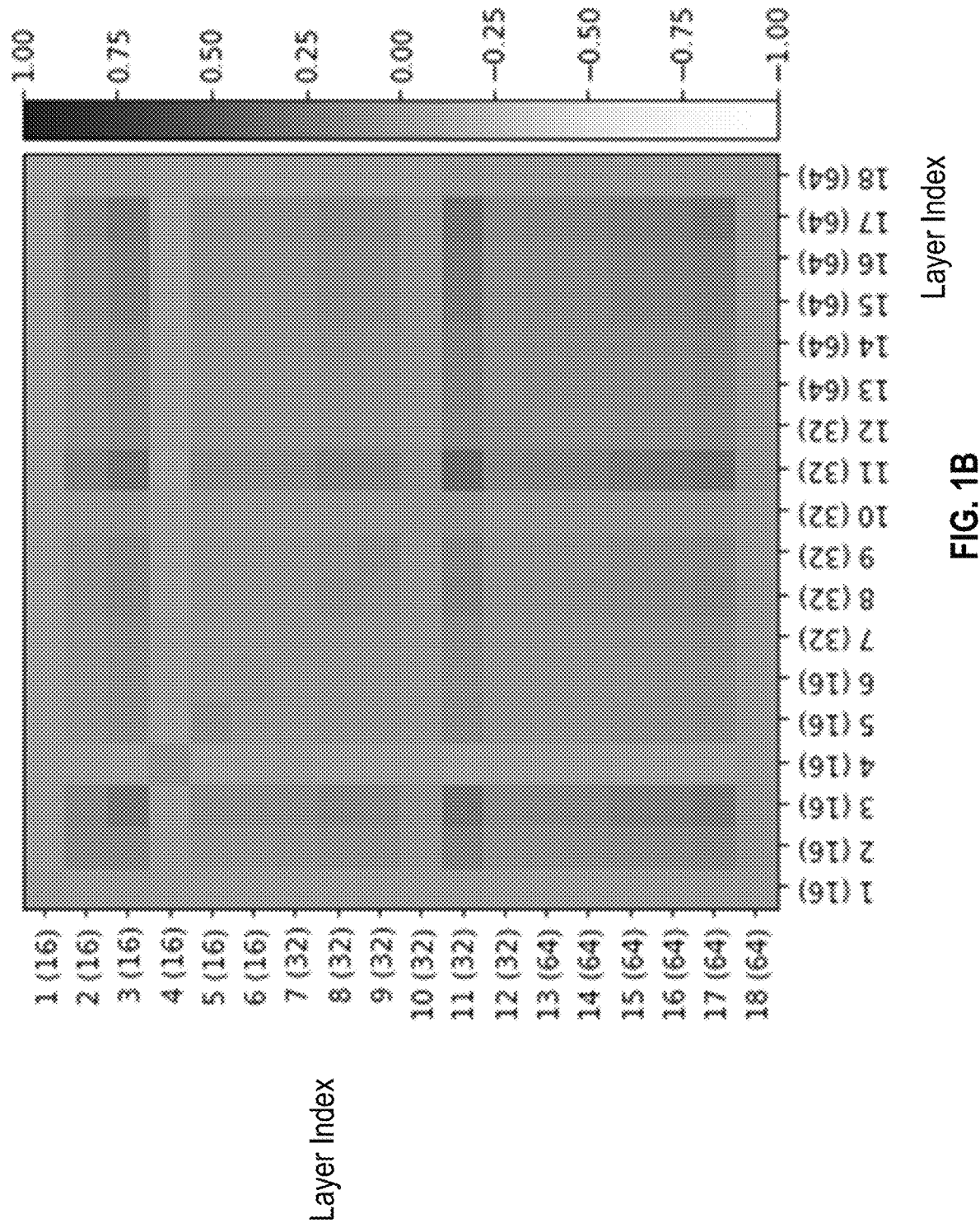
FIG. 1B depicts layer-wise cosine similarities of a neural network on a dataset, according to embodiments of the present disclosure.
Figure 6A:
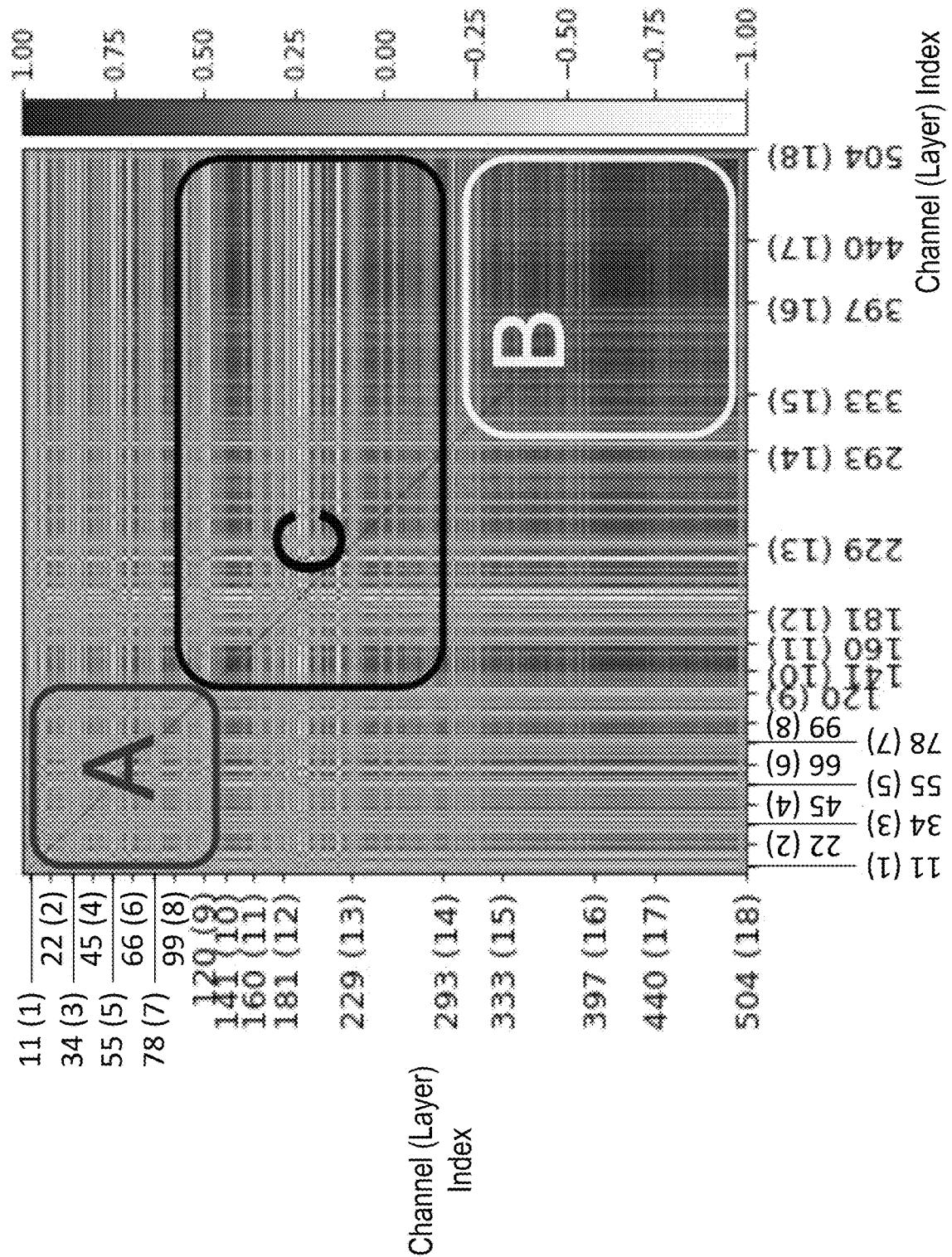
FIG. 6A depicts channel-wise similarity between a pruned network using a Graph neural network based Hypernetwork Pruning (GHP) methodology and a reference network according to embodiments of the present disclosure.
Figure 6B:
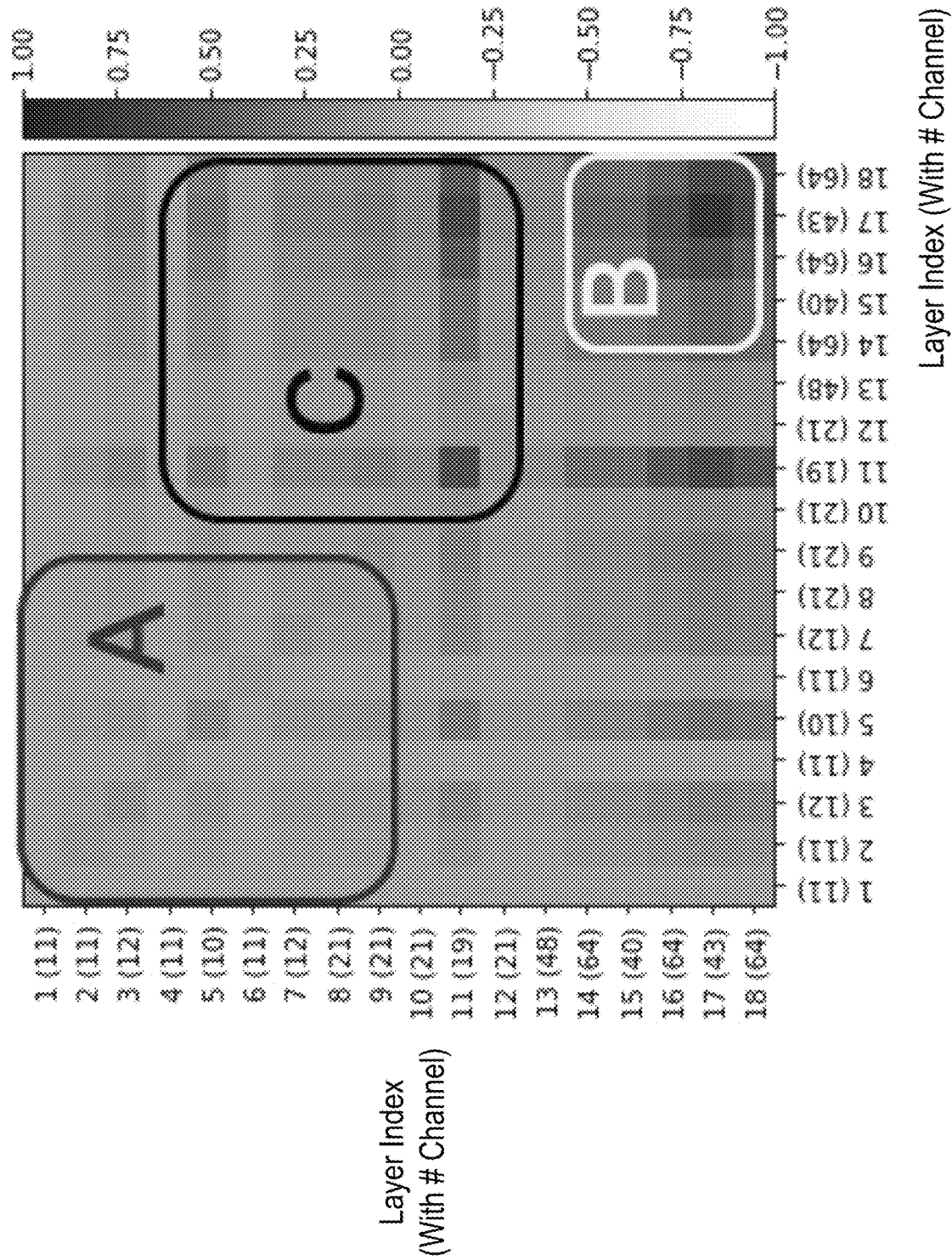
FIG. 6B depicts layer-wise cosine similarity between a pruned network using a GHP methodology and a reference network, according to embodiments of the present disclosure.

Local and global relationships: With reference to the channel and layer cosine similarity in Section A ("General Introduction"), FIG. 6A and FIG. 6B depict visualized channel-wise and layer-wise cosine similarities of a pruned ResNet20 model on CIFAR10 obtained by GHP methodology. Compared to the original ResNet20 (as shown FIG. 1A and FIG. 1B), the pruned model using embodiments of the presented GHP obtain clearer channel/layer relationships both locally and globally. Three main differences are observed. (1) GHP disentangles the dependencies of channels/layers in earlier layers (highlight A in FIG. 6A and FIG. 6B). Areas of A, B, and C in FIG. 6A and FIG. 6B are different due to their different index scales. These channels might independently extract basic features such as corners, edges and so on. (2) GHP enhances channels/layers relationships in deeper layers (highlight B). As a result, those deeper layers may further consolidate the related semantic features. (3) High similarity regions occur in off-diagonal positions (highlight C) which build information bridges between earlier and deeper layers.

F. Some Observations

The large size of CNN and its intensive computation can be an obstacle that prevents its wider applications for image and video understanding in resource-constrained situations. To reduce the computational complexity of a CNN while maintaining its performance, disclosed embodiments provide a novel GNN-based hypernetwork ("GHP"), for effectively pruning channels for a CNN (or other types of neural networks, such as transformer neural networks). Inspired by the outstanding representation ability of graph, a GNN hypernetwork is provided to effectively control the pruning process. GNN shows its encoding strength of aggregating local and global relationships among channels and layers in the entire CNN architecture effectively. With the informative node embeddings and the disclosed hypernetwork, a new pruned architecture and its weights can be effectively produced and evaluated in the whole pipeline. Extensive tests on different benchmark datasets validate effectiveness and efficiency of the disclosed GNN-based hypernetwork for CNN model pruning.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 7:
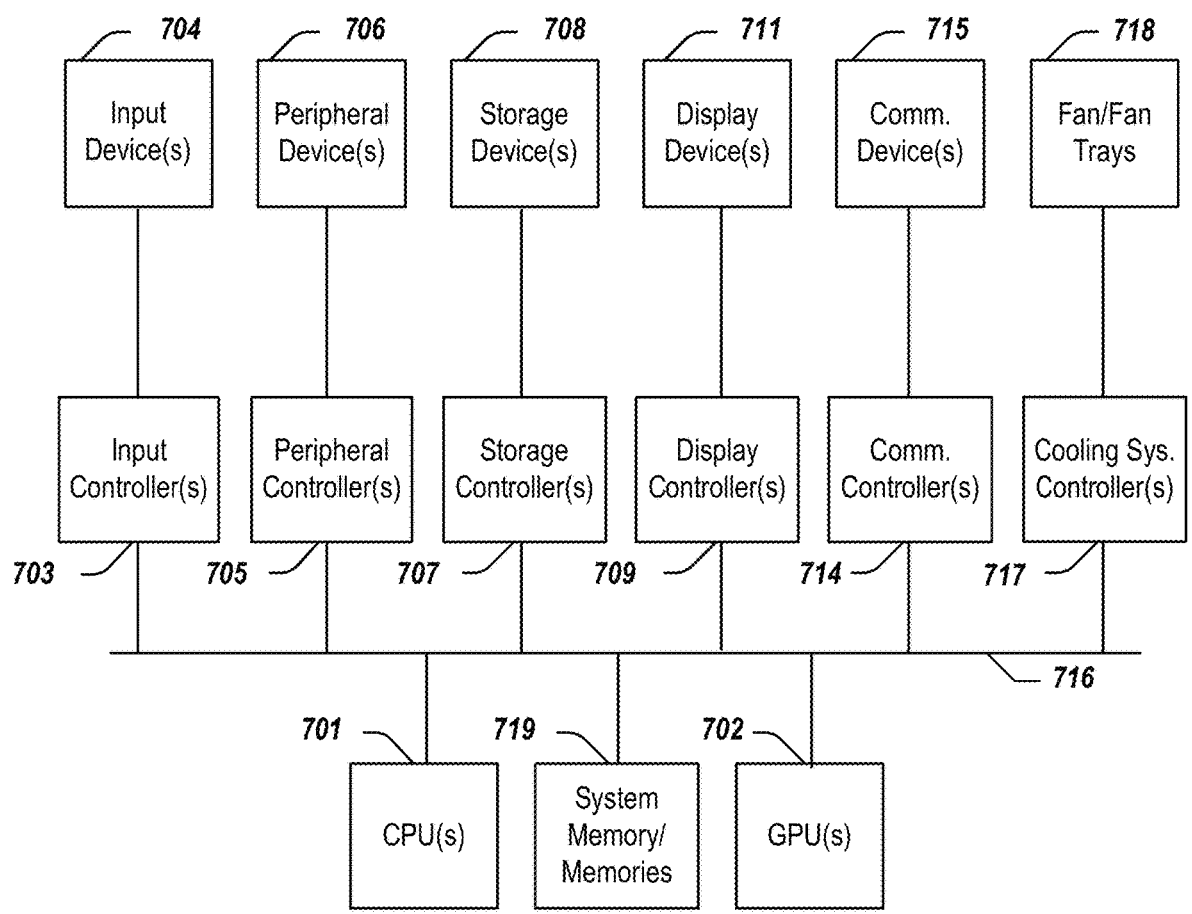
FIG. 7 depicts a simplified block diagram of a computing device/information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more CPUs 701 that provides computing resources and controls the computer. CPU 701 may be implemented with a microprocessor or the like, and may also include one or more graphics processing units (GPU) 702 and/or a floating-point coprocessor for mathematical computations. In one or more embodiments, one or more GPUs 702 may be incorporated within the display controller 709, such as part of a graphics card or cards. Thy system 700 may also include a system memory 719, which may comprise RAM, ROM, or both.

A number of controllers and peripheral devices may also be provided, as shown in FIG. 7. An input controller 703 represents an interface to various input device(s) 704. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for using a neural network pruned via a graph neural network based hypernetwork, the method comprising:
   providing input data to a final pruned neural network, the final pruned neural network being pruned via a graph neural network based hypernetwork pruning process, the graph neural network based hypernetwork pruning process comprising:
   obtaining a pretrained neural network;
   constructing an information flow graph based upon the pretrained neural network, the information flow graph comprising a node set and an edge set;
   initializing node embeddings for nodes of the information flow graph;
   responsive to a stop condition not being satisfied, performing steps associated with a graph neural network based hypernetwork, the steps comprising:
   updating the node embeddings by applying a graph neural network to the information flow graph;
   determining importance vectors of the pretrained neural network by applying a transformation function to at least some of the updated node embeddings;
   determining mask indicators for channels of the pretrained neural network by applying normalization and/or binarization operations to the importance vectors, the mask indicators indicating which of the channels of the pretrained neural network to prune to obtain a pruned neural network;
   determining weights for the pruned neural network by applying a feed-forward neural network to a function of the updated embeddings and corresponding importance vectors for the pruned neural network;
   calculating a loss using a training data set; and
   updating hypernetwork weights for the graph neural network based hypernetwork;
   responsive to the stop condition being satisfied, providing one or more output pruned neural networks; and
   selecting the final pruned neural network from the one or more output pruned neural networks; and
   obtaining one or more output labels generated by the final pruned neural network in response to the input data.

2. The computer-implemented method of claim 1, wherein the node set of the information flow graph comprises one or more of:
   layer nodes and channel nodes.

3. The computer-implemented method of claim 1, wherein initialized node embeddings for nodes of the information flow graph comprise randomly assigned embeddings or flattened weights of the pretrained neural network.

4. The computer-implemented method of claim 3, wherein the graph neural network comprises a graph convolutional network, a graph attention network, or a GraphSAGE network.

5. The computer-implemented method of claim 1, wherein the transformation function comprises a hyperbolic tangent of a function of at least the updated node embeddings and one or more learnable parameters.

6. The computer-implemented method of claim 1, wherein the feed-forward neural network comprises a multilayer perceptron for determining the weights from the at least some of the updated node embeddings and the at least some of the importance vectors, and wherein determining the weights for the pruned neural network comprises reshaping output of the multilayer perceptron into dimensions of the pruned neural network.

7. The computer-implemented method of claim 1, wherein the loss represents a cross-entropy loss for the pruned neural network and a compressionability loss.

8. The computer-implemented method of claim 7, wherein the compressionability loss is based upon a predefined floating-point operations per second (FLOPs) pruning ratio.

9. The computer-implemented method of claim 1, further comprising:
retraining or further training the final pruned neural network using the training data set.

10. The computer-implemented method of claim 1, wherein the pruning of the final pruned neural network via the graph neural network based hypernetwork pruning process contributes to a reduced inference time for generating the one or more output labels by the final pruned neural network in response to the input data relative to an inference time associated with generating one or more corresponding output labels by the pretrained neural network in response to the input data.

11. The computer-implemented method of claim 1, wherein the pretrained neural network comprises a pretrained convolutional neural network or a pretrained transformer neural network.

12. The computer-implemented method of claim 1, wherein the hypernetwork weights comprise weights for the graph neural network, weights for the transformation function, and weights for the feed-forward neural network.

13. The computer-implemented method of claim 1, wherein the stop condition comprises performance of a predetermined number of iterations, and wherein the graph neural network based hypernetwork pruning process further comprises, for at least some of the predetermined number of iterations, measuring an accuracy of the pruned neural network using a set of validation data.

14. The computer-implemented method of claim 1, wherein the final pruned neural network is selected from the one or more output pruned neural networks based upon measured accuracy, and wherein the graph neural network based hypernetwork pruning process further comprises retraining or further training the final pruned neural network using the training data set.

15. A system configured for pruning a neural network via a graph neural network based hypernetwork, the system comprising:
one or more processors;
and one or more computer-readable media that store instructions that are executable by the one or more processors to configure the system to:
provide input data to a final pruned neural network, the final pruned neural network being pruned via a graph neural network based hypernetwork pruning process, and to:
obtain a pretrained neural network;
the graph neural network based hypernetwork pruning process comprising:
construct an information flow graph based upon the pretrained neural network, the information flow graph comprising a node set and an edge set;
initialize node embeddings for nodes of the information flow graph;
responsive to a stop condition not being satisfied, performing steps associated with a graph neural network based hypernetwork, the steps comprising:
updating the node embeddings by applying a graph neural network to the information flow graph;
determining importance vectors of the pretrained neural network by applying a transformation function to at least some of the updated node embeddings;
determining mask indicators for channels of the pretrained neural network by applying normalization and/or binarization operations to the importance vectors, the mask indicators indicating which of the channels of the pretrained neural network to prune to obtain a pruned neural network;
determining weights for the pruned neural network by applying a feed-forward neural network to a function of the updated embeddings and corresponding importance vectors for the pruned neural network;
calculating a loss using a training data set; and
updating hypernetwork weights for the graph neural network based hypernetwork; and
responsive to the stop condition being satisfied, providing one or more output pruned neural networks; and
selecting the final pruned neural network from the one or more output pruned neural networks; and
obtaining one or more output labels generated by the final pruned neural network in response to the input data.

* * * * *